United States Patent
Takao et al.

(10) Patent No.: US 7,246,506 B2
(45) Date of Patent: Jul. 24, 2007

(54) THERMAL STORAGE MEDIUM USING A HYDRATE AND APPARATUS THEREOF, AND METHOD FOR PRODUCING THE THERMAL STORAGE MEDIUM

(75) Inventors: Shingo Takao, Kuki (JP); Hidemasa Ogoshi, Yokohama (JP); Shinichiro Fukushima, Yokohama (JP); Shigenori Matsumoto, Kawasaki (JP)

(73) Assignee: JFE Engineering Corporation, Tokyo (JP)

( * ) Notice: Subject to any disclaimer, the term of this patent is extended or adjusted under 35 U.S.C. 154(b) by 97 days.

(21) Appl. No.: 10/754,049

(22) Filed: Jan. 5, 2004

(65) Prior Publication Data

US 2005/0016200 A1    Jan. 27, 2005

Related U.S. Application Data

(63) Continuation of application No. 10/155,356, filed on May 23, 2002, now abandoned, which is a continuation of application No. PCT/JP00/08272, filed on Nov. 24, 2000.

(30) Foreign Application Priority Data

| Nov. 26, 1999 | (JP) | ................................. 11-336170 |
| Dec. 20, 1999 | (JP) | ................................. 11-361179 |
| Aug. 15, 2000 | (JP) | ................................. 2000-246333 |
| Aug. 15, 2000 | (JP) | ................................. 2000-246335 |

(51) Int. Cl.
  *F25D 11/00* (2006.01)
(52) U.S. Cl. ......................... 62/430; 62/54.1
(58) Field of Classification Search ................. 62/54.1, 62/114, 430, 434, 332
  See application file for complete search history.

(56) References Cited

U.S. PATENT DOCUMENTS

| 2,802,344 | A |   | 8/1957 | Witherell |
| 3,309,885 | A |   | 3/1967 | Phillips et al. |
| 3,834,456 | A |   | 9/1974 | Clarke et al. |
| 3,976,584 | A |   | 8/1976 | Leifer |
| 4,024,170 | A |   | 5/1977 | Atwood |
| 4,180,124 | A | * | 12/1979 | Shurcliff ...................... 165/86 |
| 4,188,359 | A |   | 2/1980 | Quinlan |

(Continued)

FOREIGN PATENT DOCUMENTS

JP          58-32279        3/1983

(Continued)

*Primary Examiner*—Melvin Jones
(74) *Attorney, Agent, or Firm*—Frishauf, Holtz, Goodman & Chick, P.C.

(57) ABSTRACT

A thermal storage apparatus for using a hydrate thermal storage medium including: (a) a storage tank for storing a cooling medium liquid; (b) a refrigerating machine, connected with the storage tank via a pipe for cooling the cooling medium liquid, the cooling medium liquid circulating between the storage tank and the refrigerating machine; and (c) a thermal storage body immersed in the cooling medium liquid, wherein the thermal storage medium comprises a hermetically sealed container containing an aqueous solution which generates at least one hydrate selected from the group consisting of a primary hydrate and a secondary hydrate, wherein the primary hydrate has a smaller hydration number and a small heat capacity than the secondary hydrate, and wherein the secondary hydrate has a larger hydration number and a larger heat capacity than the primary hydrate.

18 Claims, 25 Drawing Sheets

U.S. PATENT DOCUMENTS

| | | | |
|---|---|---|---|
| 4,217,329 A | 8/1980 | Quinlan | |
| 4,332,690 A | 6/1982 | Kimura et al. | |
| 4,336,156 A | 6/1982 | Quinlan | |
| 4,341,657 A | 7/1982 | Quinlan | |
| 4,498,997 A | 2/1985 | Walker | |
| 4,522,658 A | 6/1985 | Walker | |
| 4,585,572 A | 4/1986 | Lane et al. | |
| 4,585,843 A | 4/1986 | Flesher et al. | |
| 4,686,059 A | 8/1987 | Payerle | |
| 4,796,439 A | 1/1989 | Yamada et al. | |
| 4,821,794 A | 4/1989 | Tsai et al. | |
| 5,128,051 A | 7/1992 | Theis et al. | |
| 5,139,549 A | 8/1992 | Knodel et al. | |
| 5,140,824 A * | 8/1992 | Hunt | 62/59 |
| 5,159,971 A | 11/1992 | Li | |
| 5,239,839 A * | 8/1993 | James | 62/434 |
| 5,434,330 A | 7/1995 | Hnatow et al. | |
| 5,473,904 A | 12/1995 | Guo et al. | |
| 5,477,917 A | 12/1995 | Salyer | |
| 5,497,630 A | 3/1996 | Stein et al. | |
| 5,524,453 A * | 6/1996 | James | 62/434 |
| 5,758,502 A | 6/1998 | Utamura et al. | |
| 5,778,685 A | 7/1998 | Singh et al. | |
| 5,979,479 A | 11/1999 | Hellsten et al. | |
| 6,028,234 A | 2/2000 | Heinemann et al. | |
| 6,059,016 A | 5/2000 | Rafalovich et al. | |
| 6,082,118 A | 7/2000 | Endrizzi et al. | |
| 6,096,680 A | 8/2000 | Park | |
| 6,158,499 A | 12/2000 | Rhodes et al. | |
| 6,162,391 A | 12/2000 | Kowata et al. | |
| 6,237,346 B1 | 5/2001 | Ogoshi et al. | |
| 6,268,317 B1 | 7/2001 | Kawakami et al. | |
| 6,303,080 B1 | 10/2001 | Tuma | |
| 6,350,928 B1 | 2/2002 | Waycuilis et al. | |
| 6,370,908 B1 | 4/2002 | James | |
| 6,374,907 B1 | 4/2002 | Tousignant et al. | |
| 6,393,861 B1 | 5/2002 | Levenduski et al. | |
| 6,408,633 B1 | 6/2002 | Carr | |
| 6,432,320 B1 | 8/2002 | Bonsignore et al. | |
| 6,481,213 B2 | 11/2002 | Carr et al. | |
| 6,510,698 B2 | 1/2003 | Kasai et al. | |
| 6,528,025 B1 | 3/2003 | Boesch et al. | |
| 6,560,971 B2 | 5/2003 | Takao et al. | |
| 6,562,121 B2 | 5/2003 | Nickel et al. | |
| 6,584,793 B2 | 7/2003 | Fukushima et al. | |
| 6,653,516 B1 | 11/2003 | Yoshikawa et al. | |
| 6,681,593 B1 | 1/2004 | Gundlach | |
| 6,701,742 B2 | 3/2004 | Mack et al. | |
| 6,703,534 B2 | 3/2004 | Waycuilis et al. | |
| 6,858,157 B2 | 2/2005 | Davidson et al. | |
| 6,994,156 B2 | 2/2006 | Kopko | |
| 7,032,398 B2 | 4/2006 | Dilk et al. | |
| 2001/0047662 A1 | 12/2001 | Takao et al. | |
| 2002/0014329 A1 | 2/2002 | Carr et al. | |
| 2002/0083720 A1 | 7/2002 | Takao et al. | |
| 2002/0189277 A1 | 12/2002 | Takao et al. | |
| 2003/0151030 A1 | 8/2003 | Gurin | |
| 2004/0020123 A1 | 2/2004 | Kimura | |
| 2004/0069454 A1 | 4/2004 | Bonsignore et al. | |
| 2004/0162452 A1 | 8/2004 | Waycuilis | |
| 2004/0211205 A1 | 10/2004 | Spinner et al. | |
| 2005/0016200 A1 | 1/2005 | Takao et al. | |
| 2005/0163681 A1 | 7/2005 | Takao et al. | |
| 2005/0262870 A1 | 12/2005 | Narayanamurthy et al. | |
| 2006/0005558 A1 | 1/2006 | Otake et al. | |
| 2006/0009664 A1 | 1/2006 | Lokshin et al. | |
| 2006/0070385 A1 | 4/2006 | Narayanamurthy et al. | |

FOREIGN PATENT DOCUMENTS

| | | | |
|---|---|---|---|
| JP | 58-168891 | | 10/1983 |
| JP | 59-134494 | | 8/1984 |
| JP | 61-7376 | | 1/1986 |
| JP | 61-145274 | | 7/1986 |
| JP | 1-88327 | | 6/1989 |
| JP | 7-19682 | | 1/1990 |
| JP | 2-40431 | | 2/1990 |
| JP | 2-203138 | | 8/1990 |
| JP | 2-122980 | | 10/1990 |
| JP | 2-122981 | | 10/1990 |
| JP | 5-149656 | | 6/1993 |
| JP | 6-46179 | | 6/1994 |
| JP | 6-159963 | | 6/1994 |
| JP | 09-157640 | * | 6/1997 |
| JP | 9-157640 | | 6/1997 |
| JP | 9-291272 | | 11/1997 |
| JP | 2863226 | | 12/1998 |
| JP | 11-264681 | | 9/1999 |
| JP | 2000-233101 | | 8/2000 |
| JP | 2001-280874 | | 10/2001 |

* cited by examiner

THERMAL STORAGE MEDIUM USING A HYDRATE AND APPARATUS THEREOF, AND METHOD FOR PRODUCING THE THERMAL STORAGE MEDIUM

CROSS-REFERENCE TO RELATED APPLICATIONS

This application is a continuation application of application Ser. No. 10/155,356 filed May 23, 2002 now abandoned, which is a continuation application of International application PCT/JP00/08272 filed Nov. 24, 2000.

FIELD OF THE INVENTION

The present invention relates to an apparatus for storing heat utilizing latent heat of hydrate, specifically to a thermal storage medium, which contains large number of thermal storage body immersed in a cooling medium liquid such as water. And, each cooling medium body contains, in hermetic state, a hydrate or an aqueous solution that generates hydrate slurry as the latent heat generating material. Furthermore, the present invention relates to a thermal storage medium suitable for the thermal storage system such as air conditioners and the like, and relates to a method for producing the thermal storage medium.

BACKGROUND OF THE INVENTION

Conventionally, for increasing the thermal storage capacity of a water tank for storing heat using the sensible heat of water, there is a related art of immersing large number of thermal storage body in the water in the tank. That type of related art has an advantage of increasing the thermal storage capacity utilizing existing water tank being used to store heat.

An examples of the above-described thermal storage body is a hermetically sealed container containing a thermal storage medium which solidifies at or above the water-solidification temperature, that's to say, 0° C. or above, such as various kinds of wax. In the process, thermal storage medium is solidified before water solidifies, thus utilizing the latent heat of the thermal storage medium to increase the thermal storage capacity.

However, that type of cooling medium body has a drawback. In the above-mentioned process, when the thermal storage medium in the cooling medium body solidifies, no fluidization of the thermal storage medium occurs, inside the thermal storage medium body. Furthermore, because of the low thermal conductivity of the solidified thermal storage medium, the efficiency of heat exchange reduces, between the water in the water tank and the thermal storage medium.

To prevent the drawback, there is a countermeasure to decrease the size of container, which has the cooling medium body, and to increase the surface area relative to the volume. The method, however, needs to charge a vast number of thermal storage bodies into the water tank. Thus, in case of using a large-sized water tank, a vast number of thermal storage bodies are required.

In the above-described water tank or the like for storing heat, the temperature of internal thermal storage medium, or water, varies with various conditions. For example, the thermal storage temperature is necessary to be changed depending on the kind of refrigerating machine that cools the water in the water tank, or depending on the usage of the thermal load side that utilizes the water of the water tank as the thermal storage tank.

Accordingly, the conventional thermal storage medium such as one kind of wax is not suitable for attaining thermal storage temperature in various kinds of usage because of fixed solidification temperature thereof. As a result, the thermal storage temperature of the above-described water in the water tank has the restricted range.

Furthermore, from the viewpoint of the thermal storage medium of the related art as a thermal storage apparatus, various kinds of apparatus for thermal storage medium are used in air-conditioners and the like. The thermal storage medium are used to store discontinuously supplied energy such as midnight power and waste heat generated in plants, thus to effectively use energy by utilizing thus stored cold heat at air-conditioners.

The apparatus, which uses ice, is known as one of the thermal storage medium apparatus in the world. In the apparatus, which makes use of the ice, the ice is produced during midnight time by utilizing midnight power and the like, and the cold thermal stored heat is utilized at air-conditioners during daytime. Compared with the apparatus by thermal storage medium, which utilizes sensible heat of water, the ice-used thermal storage medium has an advantage of capable of storing a large amount of the cold thermal capacity owing to the latent heat of the ice. In order to produce the ice, however, water requires to be cooled to a further low temperature than the solidification temperature thereof. On the contrary, the solidification temperature of the water is low. Therefore, the coefficient of performance of the refrigerating machine degrades. In addition, the ice and the ice slurry are difficult in handling and transporting, so the apparatus becomes complex and large.

From another point of view, there is a thermal storage medium body made of gas hydrate, which is disclosed in, for example, JP-A-2-203138, (the term "JP-A" referred herein signifies the "unexamined Japanese patent publication"). The technology disclosed in the patent publication, however, uses chlorofluorocarbon-base refrigerant R11 as the coolant for generating gas hydrate. The R11 is a compound having large ozone depletion potential, and exists as gas phase under atmospheric pressure, thus a hermetically sealed container requires, which raises a problem to needs the expensive apparatus using the thermal storage medium.

SUMMARY OF THE INVENTION

The present invention was completed on the basis of the above-described background. An object of the present invention is to provide a thermal storage medium for storing heat by immersing a cooling medium body in a cooling medium liquid such as water, wherein a hydrate is used as the thermal storage medium in the cooling medium body to improve the efficiency of heat exchange with the cooling medium liquid, and to provide a thermal storage medium that can adjust the thermal storage temperature of the cooling medium liquid responding to individual uses, and that prevents supercool of aqueous solution, which generates the hydrate.

Furthermore, the inventors of the present invention carried out the studies to present a hydrate-base thermal storage medium that can be generated at higher temperatures than the temperature of ice, (hereinafter "a solid-liquid mixed phase hydrate slurry consisting of hydrate, hydrate particles, and aqueous solution" is referred to simply as "a hydrate-base thermal storage medium"), and focused on hydrates of tetra-n-butylammonium bromide and the like. The hydrate of tetra-n-butylammonium bromide obtained by cooling an aqueous solution of tetra-n-butylammonium bromide can readily be prepared in a form of hydrate or hydrate slurry by cooling the aqueous solution using commonly available cooling water, brine, or the like. The hydrate of tetra-n-butylammonium bromide has a large amount of heat capacity. The present invention provides a method for efficiently producing the hydrate-base thermal storage medium.

Thus, the present invention discloses the following.

Firstly, a thermal storage apparatus for using a hydrate thermal storage medium comprising: a storage tank for storing a cooling medium liquid; a refrigerating machine, connected with the storage tank via a pipe for cooling the cooling medium liquid, the cooling medium liquid circulating between the storage tank and the refrigerating machine; a thermal storage body immersed in the cooling medium liquid, wherein the thermal storage medium comprising, a hermetically sealed container, an aqueous solution to generate a hydrate, being filled in the hermetically sealed container to generate a hydrate, fine particles to prevent the aqueous solution from super-cooling, the fine particles being contained in the hermetically sealed container.

Secondly, a hydrate thermal storage medium comprising: an aqueous solution containing a guest compound; wherein the aqueous solution comprising, a slurry of a thermal storage medium containing the hydrate of the guest compound, a corrosion inhibitor of at least one compound selected from the group consisting of sodium nitrite, sodium sulfite, sodium pyrophosphate, and benzotriazole.

Thirdly, a method for producing a hydrate thermal storage medium comprising the steps of: (a) preparing an aqueous solution containing a guest compound; and, (b) cooling the aqueous solution to produce a hydrate slurry.

Fourthly, a method for producing a hydrate slurry comprising the steps of: (a) preparing an aqueous solution containing a guest compound; and, (a) cooling the aqueous solution and contacting nucleus particles as nuclei of the hydrate particles with the aqueous solution to produce the hydrate particles.

Fifthly, an apparatus for producing hydrate slurry by cooling an aqueous solution containing a guest compound and by generating hydrate particles comprising: a generation heat exchanger having a heat transfer surface for cooling the aqueous solution and cooling the aqueous solution by contacting the aqueous solution with the heat transfer surface; and, a nucleus particles supply mechanism for supplying the nucleus particles as nuclei of the hydrate particles to the aqueous solution passing through the generation heat exchanger.

Sixly, an apparatus for producing a hydrate slurry by cooling an aqueous solution containing a guest compound and by generating hydrate particles, comprising: a generation heat exchanger having a heat transfer surface for cooling the aqueous solution and cooling the aqueous solution by contacting the aqueous solution with the heat transfer surface; and, an agitation mechanism for dispersing and floating the nucleus particles as nuclei of the hydrate particles in the aqueous solution.

BEST MODE FOR CARRYING OUT THE INVENTION

Best Mode A

Figure 1:
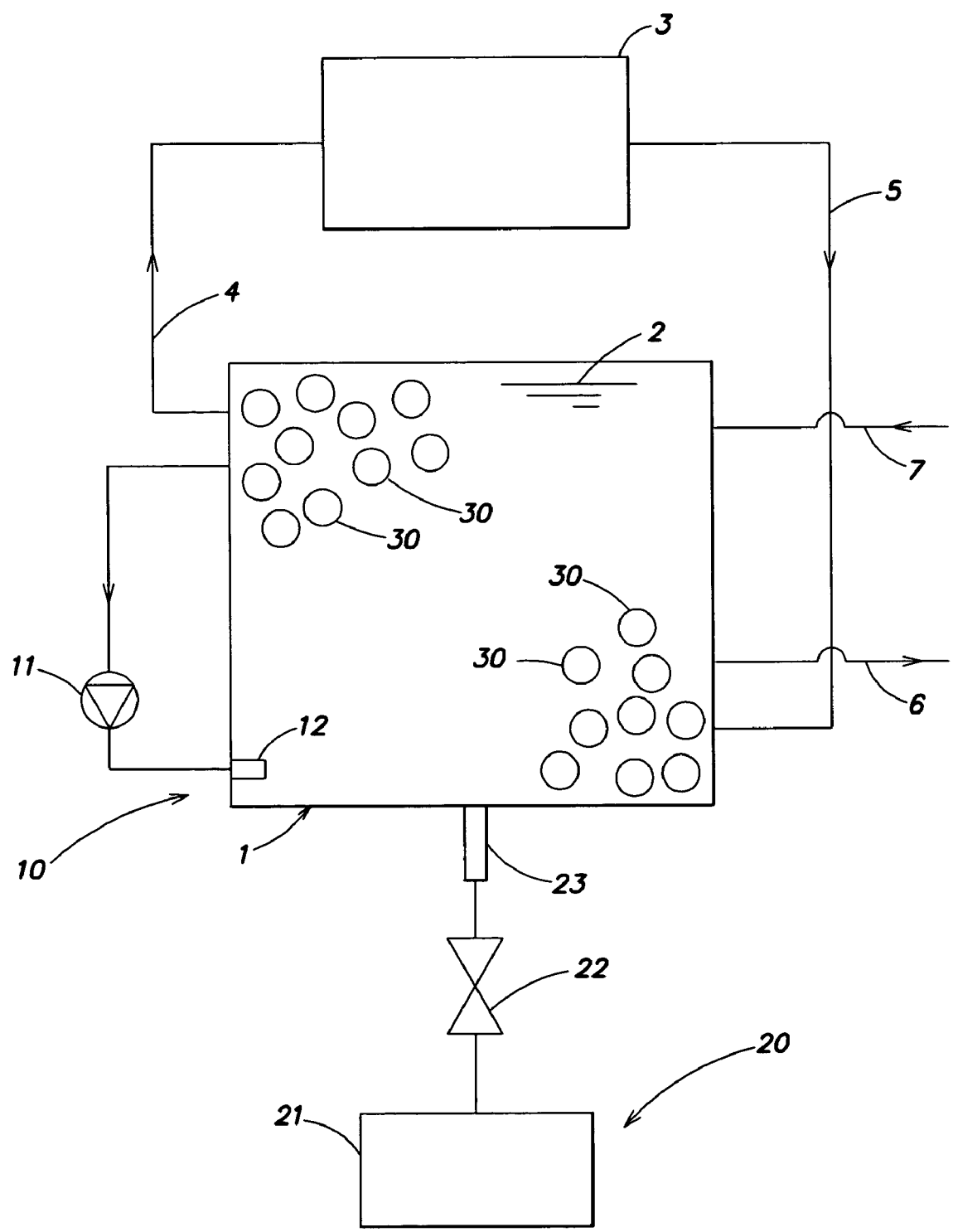
FIG. 1 shows a schematic drawing of a thermal storage medium of the First Embodiment of the Best Mode A according to the present invention.

The Best Mode A for carrying out the present invention is described below referring to the drawings. The Best Mode A uses an aqueous solution of a thermal storage medium, or a guest compound, sealed in a container of cooling medium body. An example of the guest compound is tetra-n-butylammonium bromide (hereinafter referred to as TBAB).

The aqueous solution of TBAB varies the temperature of generating the hydrate thereof depending on the concentration of TBAB. That is, increased concentration of TBAB increases the temperature of generating the hydrate, and decreased concentration of TBAB decreases the temperature of hydrate generation. Accordingly, if the concentration of TBAB in the aqueous solution is adjusted to a low level, and if the temperature of hydrate generation, or the thermal storage temperature, is adjusted to a low level, the stored heat can be used as thermal storage tank for cooling service or the like. If the concentration of TBAB in the aqueous solution is determined to increase the hydrate generating temperature to a high level, the stored heat can also be used as hot for heating snow-melting roads, snow-melting roofs, temperature-conditioned warehouses for preventing freezing in the cold district.

The above-described TBAB aqueous solution may generate hydrate particles at around 12° C., for example, to create a hydrate slurry. The aqueous solution may, however, induce supercooling. If the supercooling occurs, the hydrate particles cannot be generated, unless the aqueous solution is cooled to below the above-given temperature of 12° C., which degrades the efficiency of refrigerating machine. If the supercool state is vanished, the generated hydrate may adhere to the wall surface of the container, or the generated hydrate particles may agglomerate to each other to degrade the fluidity of the hydrate slurry.

Applicable guest compounds other than TBAB given above include tetra-iso-amylammonium salt, tetra-iso-butylphosphonium salt, and tri-iso-amylsulfonium salt.

Figure 2:
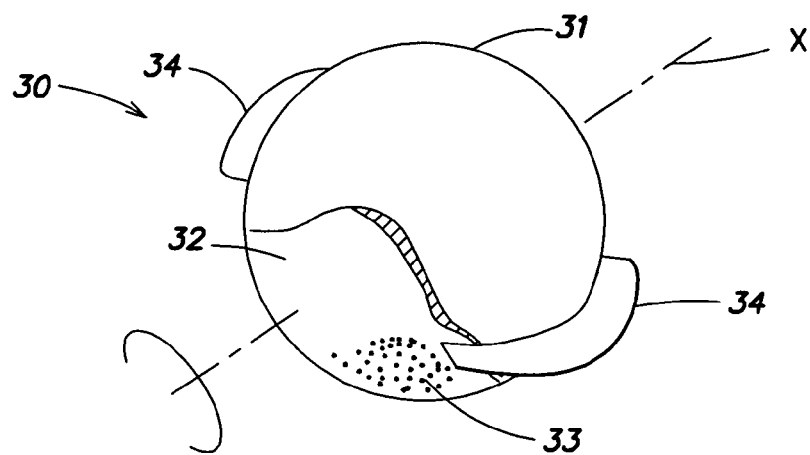
FIG. 2 shows a perspective view of a cooling medium body of the First Embodiment of the Best Mode A according to the present invention.

FIG. 1 and FIG. 2 show the First Embodiment of the Best Mode A. The First Embodiment adopts a tank 1, which contains a cooling medium liquid such as water 2. The First Embodiment also applies a refrigerating machine 3. The water 2 in the tank 1 circulates between the tank 2 and the refrigerating machine 3 via pipes 4, 5. Thus, the water 2 is cooled to store cold heat.

The water 2 in the tank 1 also circulates between the tank 1 and cold heat load-side (not shown) such as air conditioner via pipes 6, 7, to utilize the stored cold heat. The water 2 in the tank 1 has a large number of thermal storage body 30 immersed therein, thus increasing the heat capacity of the water 2 in the tank 1. The configuration of this thermal storage body 30 is described later.

There is a circulation mechanism 10 in the tank 1 as a container drive means that changes the position of the thermal storage body 30 or moves the thermal storage body 30. The circulation mechanism 10 contains a pump 11, a nozzle 12, and other components to circulate the water 2 in the tank 1 to flow or agitate thereof.

There is an air-injection mechanism 20 at the bottom of the tank 1 to change the position of the thermal storage body 30 or move the thermal storage body 30. The air-injection mechanism 20 contains a high-pressure air source 21, a valve 22, a nozzle 23, and other components to inject air from the bottom of the tank 1 into the water 2, thus agitating the water 2 in the tank 1 by ascending air bubbles.

The configuration of the cooling medium body 30 is described below referring to FIG. 2. The cooling medium body 30 is provided with a spherical hermetically sealed container 31. The container 31 contains an aqueous solution 32 containing TBAB.

In addition, a specified quantity of air or other gas is sealed in the container 31 to bring the apparent specific gravity of the whole cooling medium body 30 to equal with the specific gravity of surrounding cooling medium liquid, for example, water. Consequently, the heart reservoir 30 can freely float in the water.

Instead of forming a space in the container 31 by sealing a gas, a shrinkable ball or cylindrical gas capsule containing sealed gas therein may be put into the container 31 of the cooling medium body 30 to adjust the total specific gravity of the cooling medium body 30. Furthermore, the generation of hydrate can be enhanced by adhering fine particles to the inner surface of the gas capsule.

The above-described space or gas capsule is able to compensate the volume changes caused by expansion and shrink of the aqueous solution 32 in the container 31 of the cooling medium body 30 or by generation of hydrate, through the expansion and shrink of the space or gas capsule.

Furthermore, fine particles 33 are sealed in the container 31 to prevent supercool of the above-described aqueous solution. An example of the fine particles 33 is granulated slag particles having a particle size to allow them float in the aqueous solution. The fine particles 33 have sedimenting property to sediment during a long time of stationary state. When the hydrate particles, which were generated using the fine particles 33 as the nuclei in the container 31, are melted in the container 31, and when the generation and melting of the hydrate particles are repeated, the fine particles 33 tend to deposit on the inner surface of the container 31.

According to the First Embodiment, a pair of blade members 34 is attached to outside of the spherical container 31 extending outward therefrom. Each of these blade members 34 is attached at different angle relative to the outer surface of the container 31 to each other. Consequently, when the surrounding water flows, the drag or lift generated on these blade members 34 makes the container 31 rotate centering on, for example, X axis.

The function of the apparatus of the First Embodiment is described below. The refrigerating machine 3 is operated by, for example, midnight surplus power, to store the produced cold heat to the water 2 in the tank 1.

If the water 2 in the tank 1 is cooled, the internal aqueous solution 32 is cooled via the wall of the container 31 of the cooling medium body 30 to generate hydrate particles, thus creating hydrate slurry. When the water 2 in the tank 1 is used as the thermal storage tank, inversely from the above-described process, the hydrate slurry in the cooling medium body 30 melts. Accordingly, the latent heat of the hydrate increases the thermal storage capacity of the cooling medium body 30.

Since the above-described hydrate slurry is fluidable, the efficiency of heat exchange with surrounding water is high. In addition, since the fine particles 33 exist in the aqueous solution 32 in the container 31, the generation of hydrate particles is enhanced using these fine particles 33 as the nuclei, thus preventing supercool of the aqueous solution.

As described above, since the fine particles 33 tend to sediment in the container 31 or adhere to inner surface of the container 31, the quantity of the fine particles dispersed and floated in the aqueous solution 32 reduces to degrade the above-described effect of preventing supercooling. Nevertheless, as described above, the water 2 in the tank 1 is circulated to flow by the circulation mechanism 10, and is agitated by ascending air bubbles created by the air injected from the air-injection mechanism 20. As a result, also the thermal storage body 30 varies their positions and moves their locations under the flow and agitation of the water 2. Thus, the aqueous solution 32 in the container 31 of the cooling medium body 30 is agitated to keep the fine particles 33 disperse and float in the aqueous solution 32. Consequently, the effect of preventing supercooling is sustained.

To enhance the dispersion and floating of the fine particles 33 by the position change and move of the container 31 of the cooling medium body 30, it is effective to place plurality of stirrer chips in the container 31. Alternatively, by attaching protrusions to the plumbing stirrer chips or setting fibers on the plumbing stirrer chips, the agitation can further be enhanced.

The dispersion and floating of the fine particles 33 can also be enhanced by applying supersonic waves and vibrations to the water 2 in the tank 1, and by transmitting the supersonic waves and vibrations to the aqueous solution 32 in the cooling medium body 30. Instead of the supersonic waves and vibrations, magnetic field, electric field, or the like may be applied for enhancing the dispersion and floating of the fine particles 33 in the aqueous solution 32.

Furthermore, treating or coating of anti-adhesives against the fine particles applied to the inner surface of the container 31 is also effective. Examples of the coating are that of fluororesin and of silicone resin.

Figure 3:
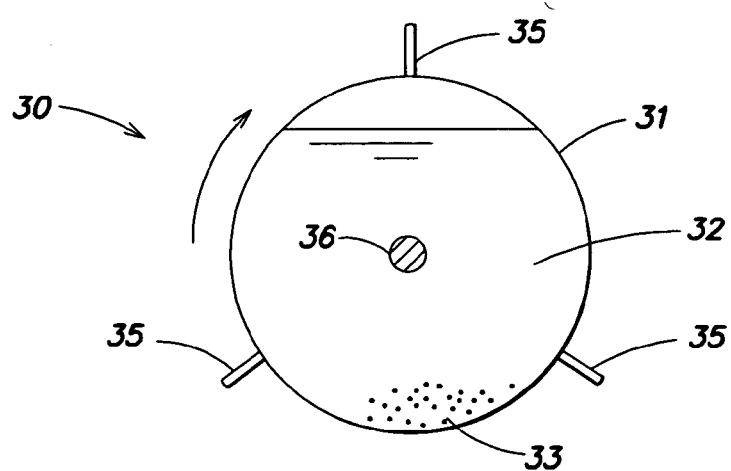
FIG. 3 shows a cross sectional view of a cooling medium body of the Second Embodiment of the Best Mode A according to the present invention.

The Best Mode A is not specifically limited to the First Embodiment. For example, FIG. 3 shows the Second Embodiment of the cooling medium body 30 in the Best Mode A. That is, the container 31 is formed in a cylindrical shape, and is allowed to freely rotate around the center axis 36. From the peripheral surface of the container 31, plurality of blade members 35 is protruded in radial directions. Water flow or ascending bubbles collides against the blade members 35 to rotate the container 31.

The Second Embodiment has the same configuration with the First Embodiment except for the above-given description, and the same component with that in the First Embodiment shown in FIG. 3 has the same reference number with that in the First Embodiment, and no further description is given here.

Figure 4:
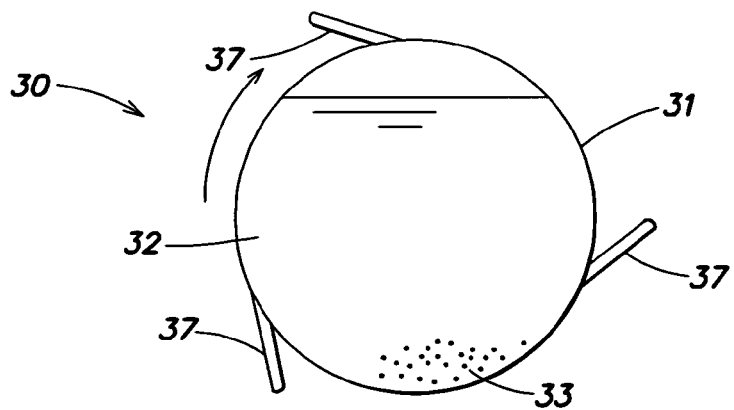
FIG. 4 shows a cross sectional view of a cooling medium body of the Third Embodiment of the Best Mode A according to the present invention.

FIG. 4 shows the Third Embodiment of the cooling medium body 30 in the Best Mode A. The cooling medium body 30 has blade members 37, corresponding to the blade members of the Second Embodiment, at a tilted angle against the peripheral surface of the container 31. Owing to the tilt angle of the blade members 37, the cooling medium body 30 of the Third Embodiment can be rotated by water flow in only one direction.

The Third Embodiment has the same configuration with the First Embodiment except for the above-given description, and the same component with that in the First Embodiment shown in FIG. 4 has the same reference number with that in the First Embodiment, and no further description is given here.

Figure 5:
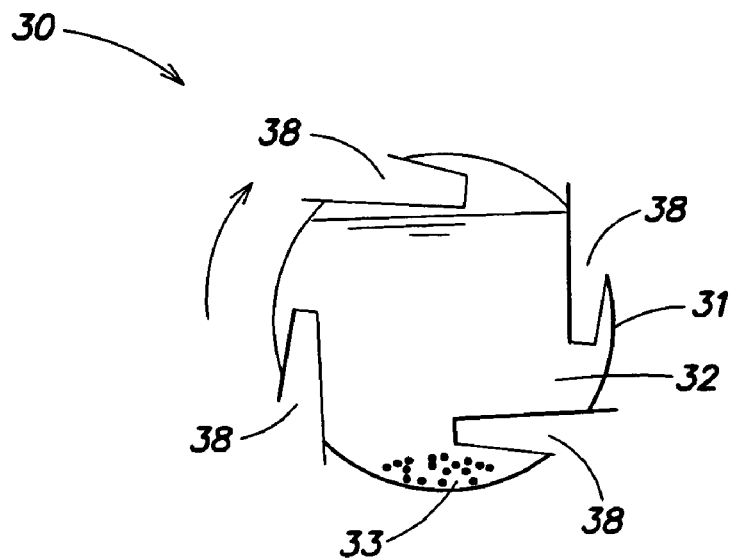
FIG. 5 shows a cross sectional view of a cooling medium body of the Fourth Embodiment of the Best Mode A according to the present invention.

FIG. 5 shows the Fourth Embodiment of the cooling medium body 30 in the Best Mode A. The cooling medium body 30 has plurality of pocket-shape concavities 38 on outer periphery of the container 31. Air bubbles are caught by a concavity 38 to rotate the cooling medium body 30. When the concavity 38 that holds the bubbles faces up, the captured bubbles are released from the concavity 38. By repeating the capture and release of bubbles, the cooling medium body 30 keeps rotating.

The Fourth Embodiment has the same configuration with the Second Embodiment except for the above-given description, and the same component with that in the Second Embodiment shown in FIG. 5 has the same reference number with that in the Second Embodiment, and no further description is given here.

Figure 6:
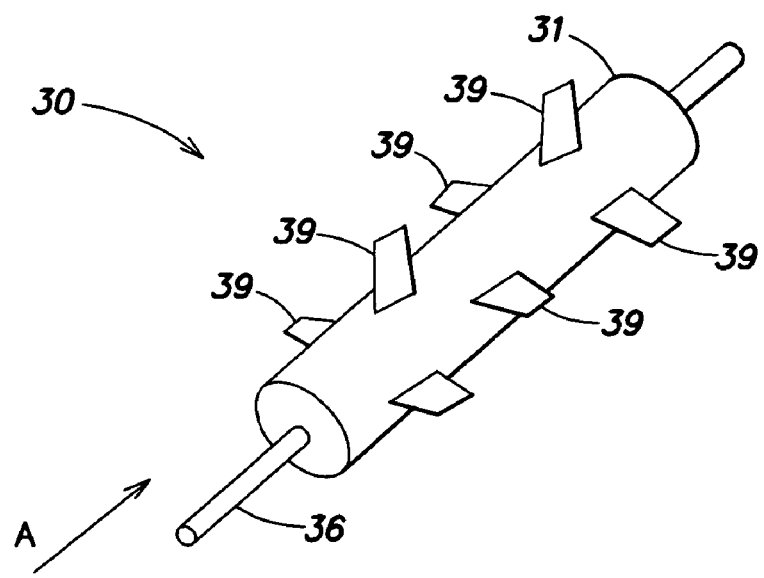
FIG. 6 shows a perspective view of a cooling medium body of the Fifth Embodiment of the Best Mode A according to the present invention.

FIG. 6 shows the Fifth Embodiment of the cooling medium body 30 in the Best Mode A. The container 31 is formed in a cylindrical shape. From the peripheral surface of the container 31, plurality of blade members 39 is protruded at a tilt angle against the axial direction of the container 31. The cooling medium body 30 of the Fifth Embodiment can rotate around the center axis 36 even by a water flow along the axis indicated by the arrow. A direction in the figure.

The Fifth Embodiment has the same configuration with the Second Embodiment except for the above-given description, and the same component with that in the Second Embodiment shown in FIG. 6 has the same reference number with that in the Second Embodiment, and no further description is given here.

Figure 7:
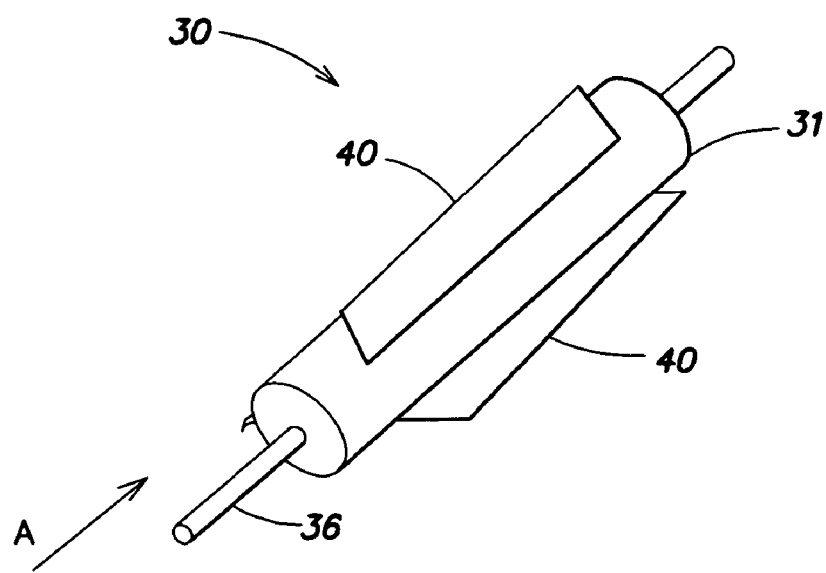
FIG. 7 shows a perspective view of a cooling medium body of the Sixth Embodiment of the Best Mode A according to the present invention.

FIG. 7 shows the Sixth Embodiment of the cooling medium body 30 in the Best Mode A. Plurality of blade members 40, each of which is continuous along the axial direction of the cylindrical container 31, are attached to the periphery of the container 31 in tilted angles both against the peripheral direction and against the axial direction. The cooling medium body 30 of the Sixth Embodiment can rotate around the center axis 36 even by a water flow along the axis indicated by the arrow A direction in the figure.

The Sixth Embodiment has the same configuration with the Third Embodiment except for the above-given description, and the same component with that in the Third Embodiment shown in FIG. 7 has the same reference number with that in the Third Embodiment, and no further description is given here.

Figure 8:
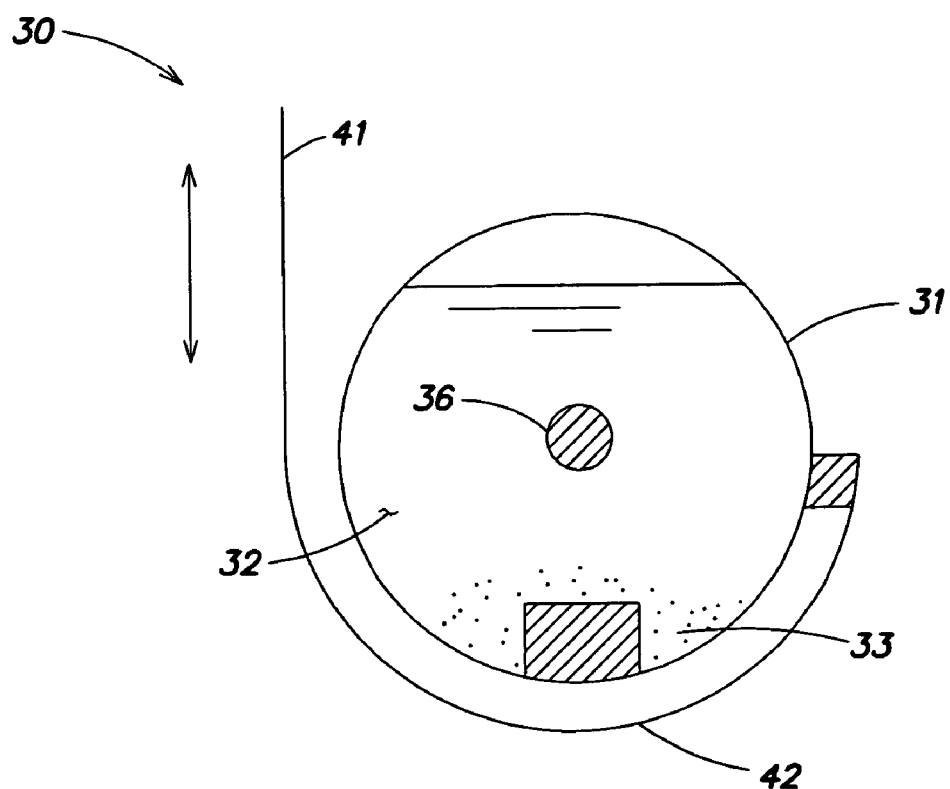
FIG. 8 shows a cross sectional view of a cooling medium body and a drive mechanism thereof of the Seventh Embodiment of the Best Mode A according to the present invention.

FIG. 8 shows the cooling medium body 30 and a drive means thereof according to the Seventh Embodiment of the cooling medium body 30 in the Best Mode A. A line 41 such as a string and a chain is wound around the cylindrical container 31. Ascending and descending the line 41 rotate the container 31. Inside of the container 31, a weight 42 to bring the container 31 to original rotational position is attached. The weight 42 may be fixed or not fixed to the inside of the container 31. In the case that the weight is not fixed, the weight functions to further disperse the fine particles.

The Seventh Embodiment has the same configuration with the Third Embodiment except for the above-given description, and the same component with that in the Third Embodiment shown in FIG. 8 has the same reference number with that in the Third Embodiment, and no further description is given here.

Figure 9:
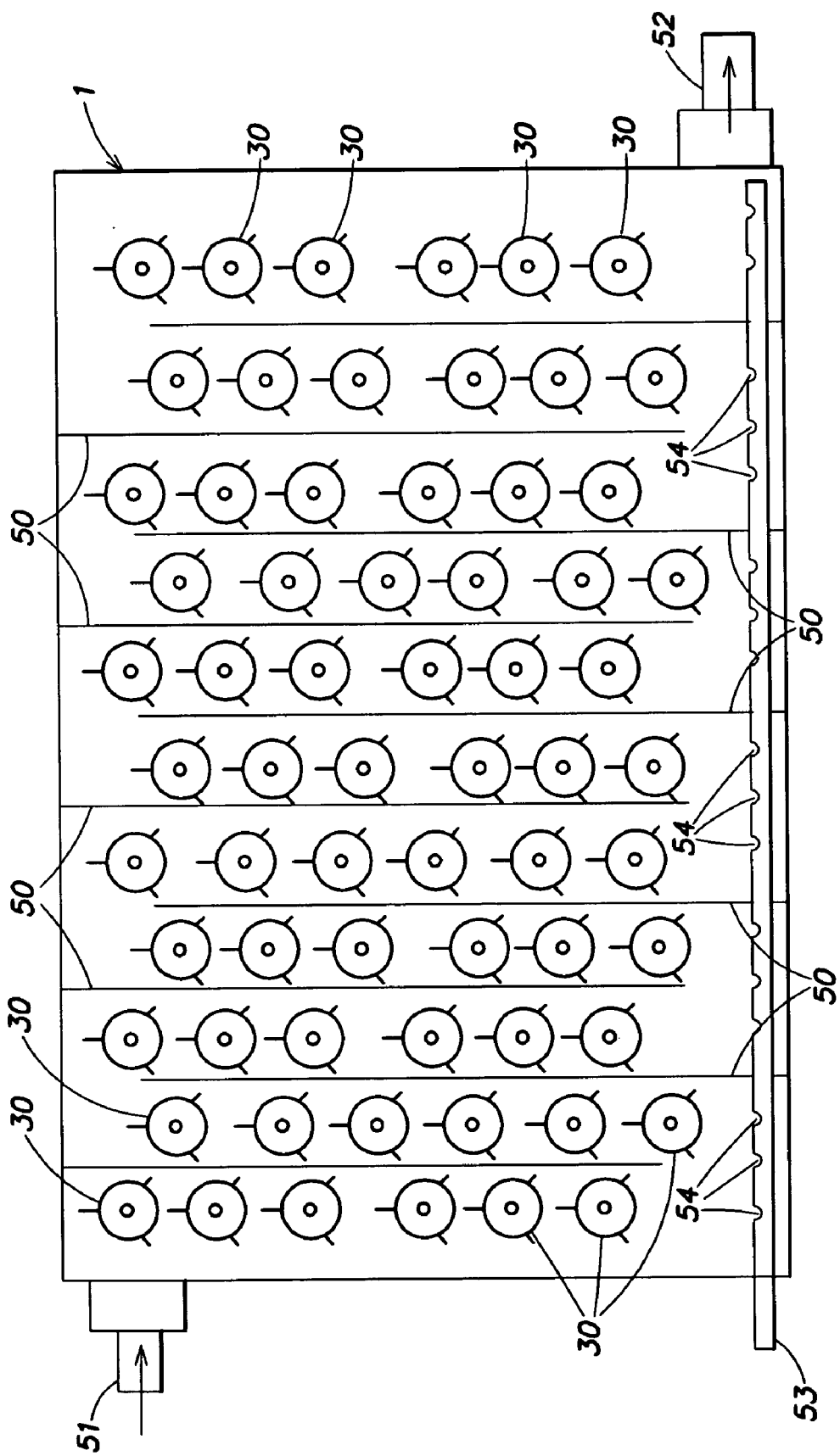
FIG. 9 shows a schematic drawing of a thermal storage medium of the Eighth Embodiment of the Best Mode A according to the present invention.

FIG. 9 shows the thermal storage medium according to the Eighth Embodiment in the Best Mode A. The tank 1 is divided to segments by plurality of nearly vertical partition plates 50. In each of the divided segments, plurality of cylindrical cooling medium body elements 30 which are similar with those applied in the Second Embodiment are placed in free rotational mode. The tank 1 is provided with a water charge opening 51 and a water discharge opening 52. An air supply pipe 53 is mounted at the bottom of the tank 1, and the air supply pipe 53 has many nozzle holes 54. According to the configuration of the Eighths Embodiment, air is ejected from the nozzle holes 54 of the air supply pipe 53 to become ascending bubbles between the partition plates 50, thus rotating each cooling medium body element 30.

The Eighth Embodiment has the same configuration with the First Embodiment except for the above-given description, and the same component with that in the First Embodiment shown in FIG. 9 has the same reference number with that in the First Embodiment, and no further description is given here.

Figure 10:
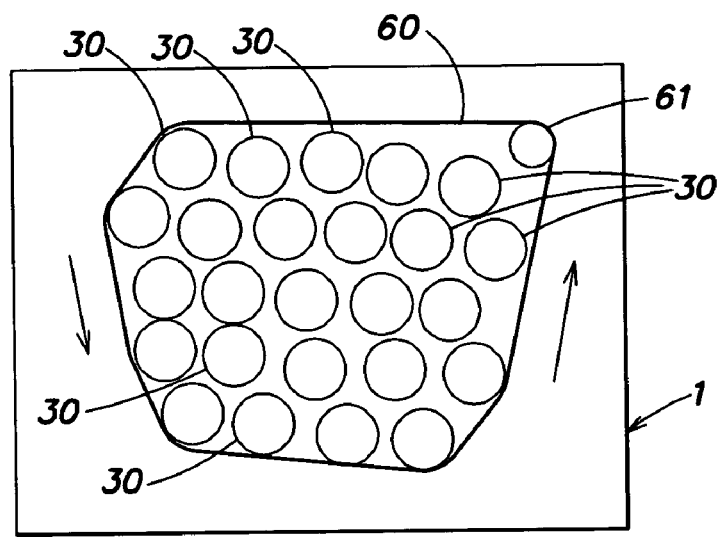
FIG. 10 shows a schematic drawing of a thermal storage medium of the Ninth Embodiment of the Best Mode A according to the present invention.

FIG. 10 shows a schematic drawing of the thermal storage medium according to the Ninth Embodiment in the Best Mode A. The thermal storage medium is provided with a mechanical drive mechanism for thermal storage body. That is, the cooling medium body 30 in the Ninth Embodiment is in cylindrical shape. The thermal storage body 30 is arranged in a group bound by a flexible endless running body 60 such as line such as string, or stripe such as belt and net. The endless running body 60 is driven by a pulley 61 to rotate each cooling medium body 30.

The Ninth Embodiment has the same configuration with the First Embodiment except for the above-given description, and the same component with that in the First Embodiment shown in FIG. 10 has the same reference number with that in the First Embodiment, and no further description is given here.

Figure 11:
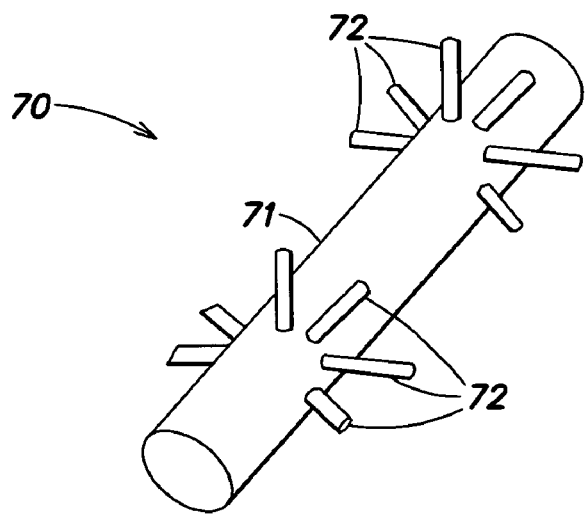
FIG. 11 shows a perspective view of a cooling medium body of the Tenth Embodiment of the Best Mode A according to the present invention.
Figure 12:
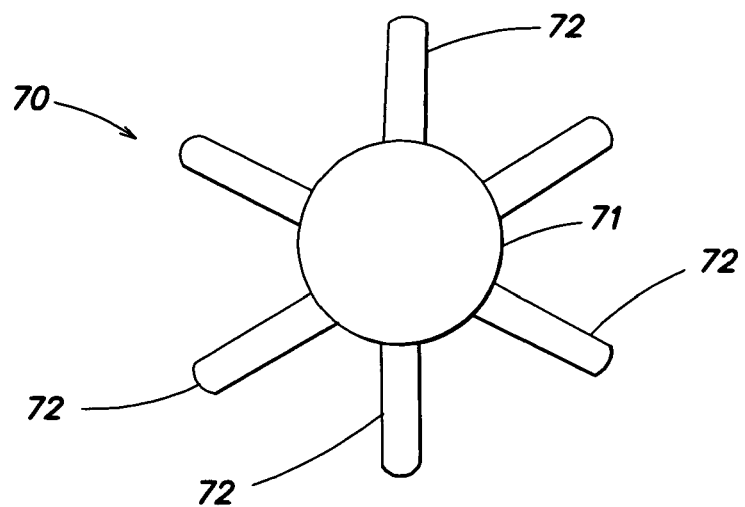
FIG. 12 shows a cross sectional view of a thermal storage medium of the Tenth Embodiment of the Best Mode A according to the present invention.

FIG. 11 and FIG. 12 show the aqueous solution stirrer used in the Tenth Embodiment in the Best Mode A. The aqueous solution stirrer 70 is put into, for example, the cylindrical container of the cooling medium body, and agitates the aqueous solution in the container under rotation of the container.

The aqueous solution stirrer 70 is structured by a pillar shape body 71 made of metal or other material and a plurality of stirring members 72 protruded from the body 72 in radial directions. When the container of the cooling medium body rotates, the aqueous solution stirrer 70 rolls and rotates in the container to agitate the aqueous solution. The aqueous solution stirrer according to the Tenth Embodiment has fine particles attached to the surface thereof. Accordingly, when the aqueous solution stirrer 70 rolls and rotates to agitate the aqueous solution, the fine particles on the surface thereof successively contact with the aqueous solution to prevent supercool of the aqueous solution.

When the aqueous solution stirrer 70 according to the Tenth Embodiment is applied, there is no need of sealing fine particles of powder into the container of the cooling medium body. Nevertheless, both of the aqueous solution stirrer 70 and the powder fine particles may be sealed in the container to increase the effect of prevention of supercool of the aqueous solution.

Figure 13:
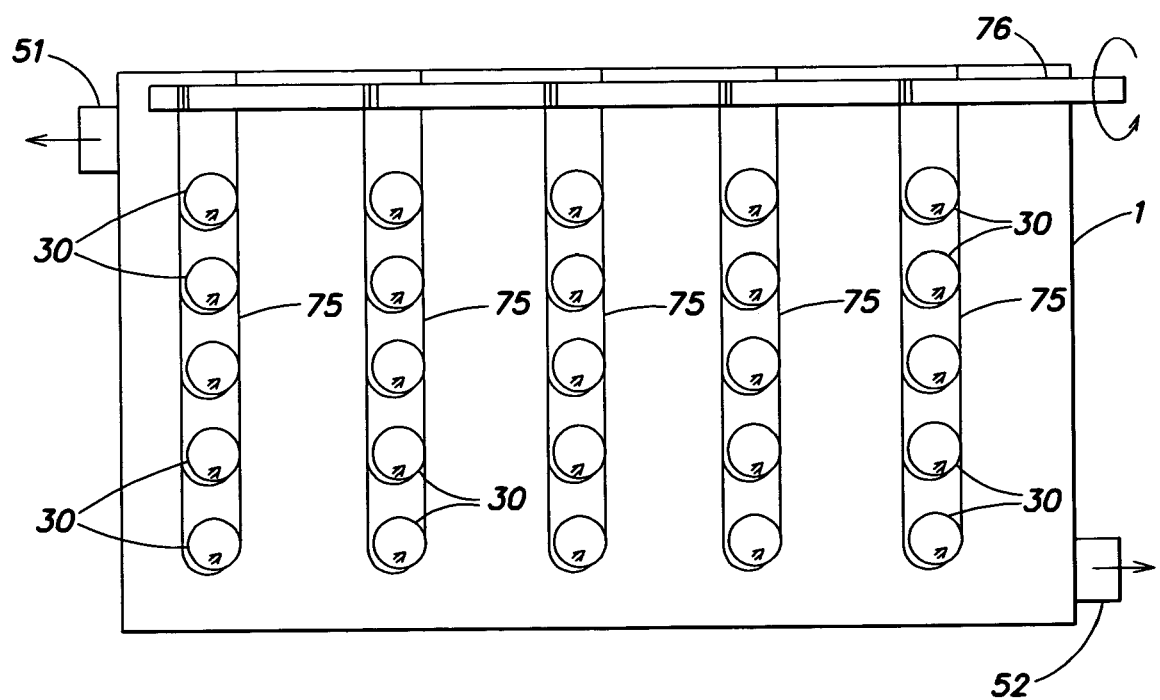
FIG. 13 shows a schematic drawing of a thermal storage medium of the Eleventh Embodiment of the Best Mode A according to the present invention.

FIG. 13 shows the cooling medium body drive mechanism of the thermal storage medium according to the Eleventh Embodiment in the Best Mode A. Similar with the Seventh Embodiment shown in FIG. 8, lines 75 winding around individual cylindrical cooling medium body 30 rotate the plurality of thermal storage body 30 at a time. An end of each line 75 is attached to the fixed side of the tank 1, such as a wall of the tank 1, while the other end thereof is wound around a rotational shaft 76.

According to the Eleventh Embodiment, when the rotary shaft 76 rotates in one direction and then in counter direction, the other end of each line 75 moves upward and downward, which makes each cooling medium body 30 rotate in one direction and then in counter direction. According to the Eleventh Embodiment, each line 75 hangs each cooling medium body 30. Therefore, there is no need of special mechanism for supporting each cooling medium body 30 in free rotational mode because each cooling medium body 30 is hung by the line 75, thus the structure of the thermal storage medium becomes simple.

The Best Mode A is not limited to the above-described Embodiments. For example, the above-given Embodiments apply a container drive mechanism. If, however, the water in the tank flows owing to the heat exchange, as observed in the case of using an existing water tank for storing heat, or if the container of cooling medium body naturally changes its position or moves caused by convection flow or by varied water level, that kind of container drive mechanism is not specifically necessary.

Best Mode B

The detail description of the Best Mode B is given below.

According to the Best Mode B, hydrate slurry of tetra-n-butylammonium bromide, (hereinafter referred to simply as TBAB), can be prepared by cooling an aqueous solution of TBAB. The concentration of TBAB aqueous solution is not specifically limited. Generally, however, an aqueous solution containing 5 to 42 wt. % TBAB is preferred. The TBAB aqueous solution is cooled preferably to a temperature range of from 5° C. to 12° C., more preferably from 5° C. to 8° C., which temperature range is used in general storage air conditioners.

The TBAB hydrate slurry prepared by cooling the TBAB aqueous solution can store and transfer the heat ranging from the stored heat transport density of water (7 Mcal/m$^3$ as sensible heat at a temperature difference of 7° C.) to about 6 times the density, or to about 42 Mcal/m$^3$.

Figure 14:
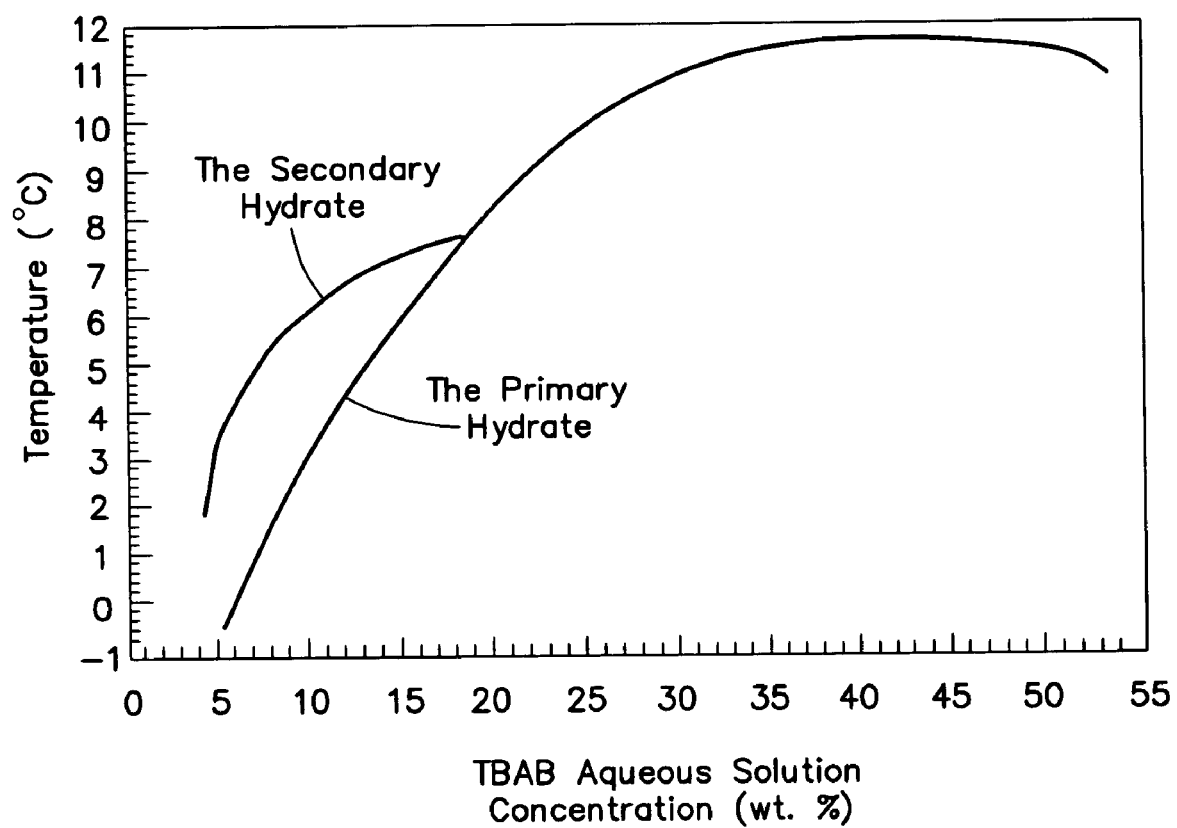
FIG. 14 is a graph showing the state of generation of TBAB hydrate, as a function of concentration and temperature of TBAB aqueous solution, of the Best Embodiment B according to the present invention.

It was found that, when a TBAB aqueous solution is cooled, primary hydrate having smaller hydration number yields secondary hydrate having larger hydration number at, for example, about 8° C. or below. FIG. 14 shows the relation between concentration and temperature of TBAB aqueous solutions, giving a graph indicating the phase equilibrium between the primary hydrate slurry and the secondary hydrate,slurry, prepared by an experiment conducted by the inventors of the present invention. As seen in FIG. 14, when a TBAB aqueous solution is cooled, the primary hydrate or the secondary hydrate is generated at around 8° C. or below. The secondary hydrate has larger heat capacity than that of the primary hydrate at a significance level. That is, when, for example, a TBAB aqueous solution containing 20 wt. % TBAB is cooled to generate the primary hydrate and the secondary hydrate, the primary hydrate has about 14 kcal/kg of heat capacity at 6° C., and the secondary hydrate has about 27 kcal/kg of heat capacity, which is a significant difference, (or about double the former value, in this case).

The hydrate-base thermal storage medium containing TBAB hydrate slurry according to the Best Mode B contains sodium nitrite, sodium sulfite, sodium diphosphate, and/or benzotriazole as the corrosion inhibitor. These kinds of corrosion inhibitor significantly reduce the corrosion of metallic materials structuring the circulation system of the hydrate-base thermal storage medium caused by the TBAB hydrate-base thermal storage medium, particularly the corrosion of iron-base metallic materials (including carbon steels and galvanized steels) and of copper-base metallic materials (including brass). In particular, sodium nitrite and sodium sulfite show excellent corrosion resistance to both the iron-base metallic materials and the copper-base metallic materials.

The concentration of the corrosion inhibitor in the TBAB hydrate slurry may be at a level to prevent corrosion. The concentration of 5,000 wt. ppm is sufficient. In particular, sodium nitrite and sodium sulfite reduce the corrosion of copper by TBAB to a level of corrosion by hot water at concentrations of max. 5,000 ppm. Normally, the concentration of corrosion inhibitor is 100 wt. ppm or more.

Figure 15:
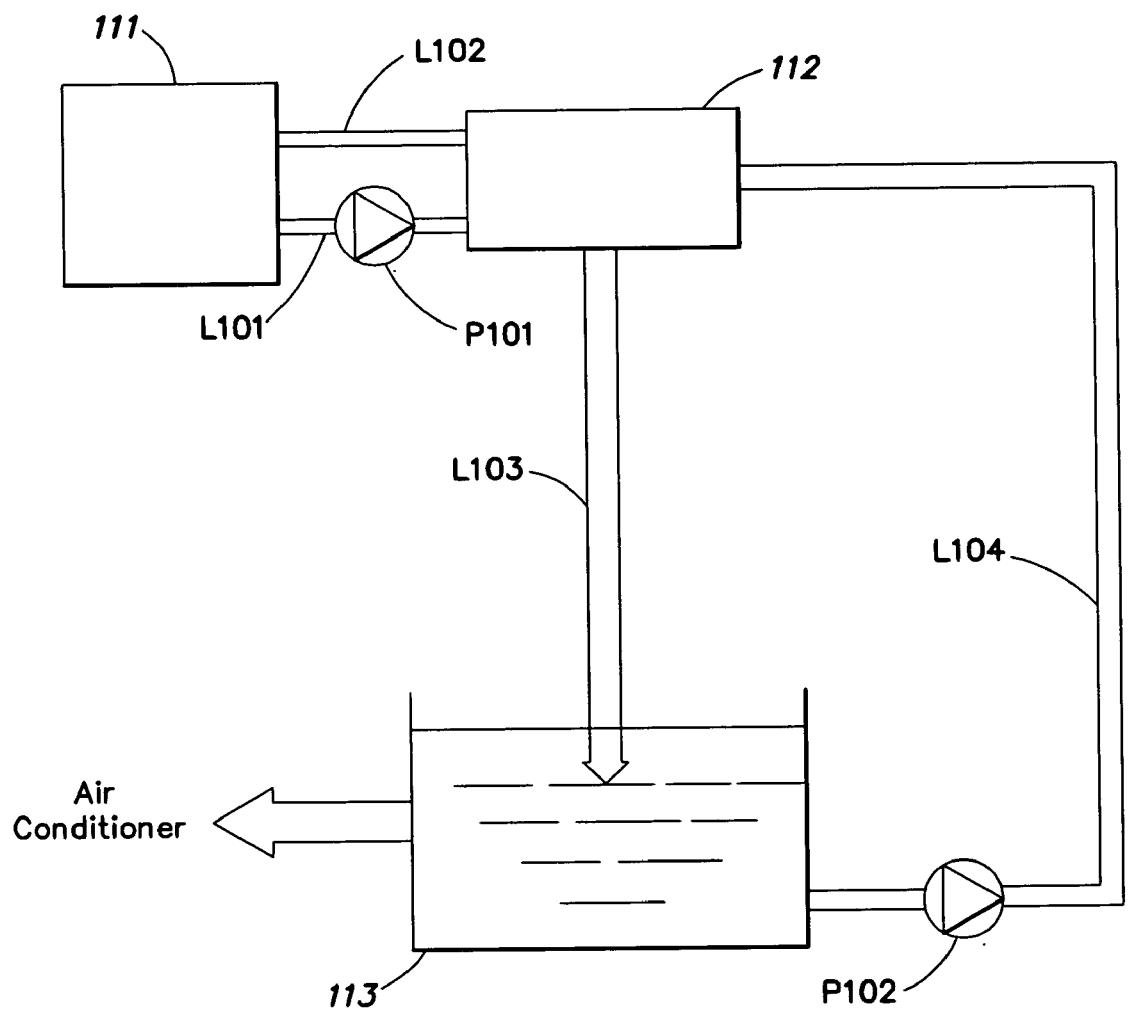
FIG. 15 is a block diagram showing an example of thermal storage system using a thermal storage medium of the Best Mode B according to the present invention.

FIG. 15 is a block diagram showing an example of thermal storage system using the thermal storage medium according to the Best Mode B. The thermal storage system given in FIG. 15 has a refrigerating machine 111, a heat exchanger 112 for producing TBAB hydrate, and an storage tank 113. There are a line L101 between the refrigerating machine 111 and the heat exchanger 112 for charging the cooled water from the refrigerating machine 111 to the heat exchanger 112, and a line L102 therebetween for circulating the heat-exchanged water from the heat exchanger 112 to the refrigerating machine 111. A water transfer pump P101 is installed in the line L101.

A line L103 connects the heat exchanger 112 and the storage tank 113.

A line L104 and a circulation pump P102 is installed in the line L104 connect the storage tank 113 and the heat exchanger 112.

On operating the thermal storage system, water cooled in the refrigerating machine 111 to, for example, 4° C. is circulated to the heat exchanger 112. At the same time, the TBAB aqueous solution containing the corrosion inhibitor according to the Best Mode B held in the storage tank 113 is circulated from the heat exchanger 112 to the storage tank 113 via the line L104 and the line L103 using the circulation pump P102, (the first circulation system). The heat-exchanged water is circulated to the refrigerating machine 111 to be cooled as described above.

The thermal storage medium according to the Best Mode B is prepared only by cooling the TBAB aqueous solution containing a specified amount of corrosion inhibitor to a temperature range of from about 5° C. to about 8° C. Normally using water and brine can be utilized as the cooling liquid to obtain the thermal storage medium. Furthermore, since the thermal storage medium according to the Best Mode B suppresses the corrosion, the degree of corrosion of piping is similar with the corrosion by water.

The Best Mode B is described below referring to examples. The Best Mode B is, however, not limited by these examples.

EXPERIMENTAL EXAMPLE 1

Figure 16:
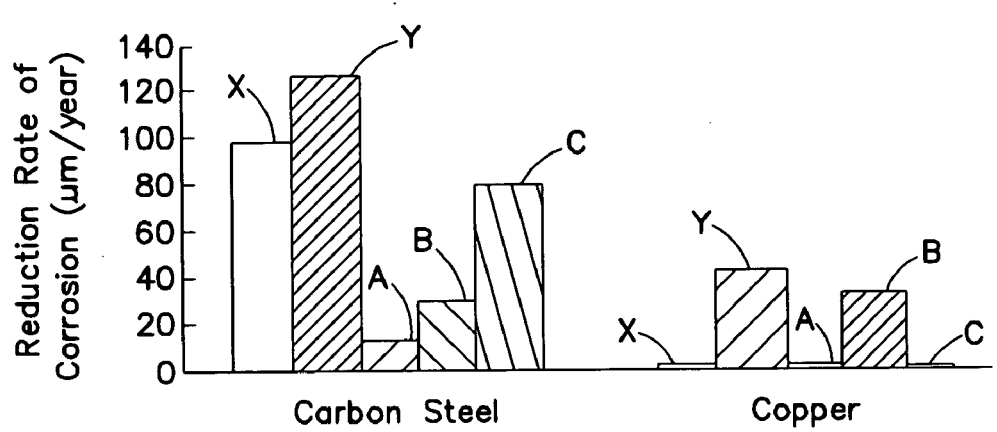
FIG. 16 is a graph showing the effect of corrosion prevention of various kinds of corrosion inhibitors in Experimental Example 1 of the Best Mode B according to the present invention.

The TBAB was dissolved in water to a concentration of 25-wt. %. Sodium nitrite, sodium diphosphate, or benzotriazole was added to thus prepared TBAB aqueous solution by 5,000 wt. ppm. A carbon steel sample or a copper sample was immersed in the TBAB aqueous solution at 80° C. for 15 days. Then, the sample was washed with water and dried, and weighed. Based on the obtained data, the mass loss of each sample over one year was calculated. The result is given in FIG. 16. Similar experiment was conducted for the case of without addition of corrosion inhibitor (or sole TBAB aqueous solution) and for the case of water instead of TBAB aqueous solution. The result is also given in FIG. 16. In the figure, X designates water, Y designates sole TBAB aqueous solution, A designates TBAB aqueous solution containing sodium nitrite, B designates TBAB aqueous solution containing sodium diphosphate, and C decimates TBAB aqueous solution containing benzotriazole.

The result revealed that sodium nitrite gives excellent corrosion-preventive effect to both carbon steel and copper, that sodium diphosphate gives excellent corrosion-preventive effect to carbon steel, and that benzotriazole gives excellent corrosion-preventive effect to copper.

EXPERIMENTAL EXAMPLE 2

Figure 17:
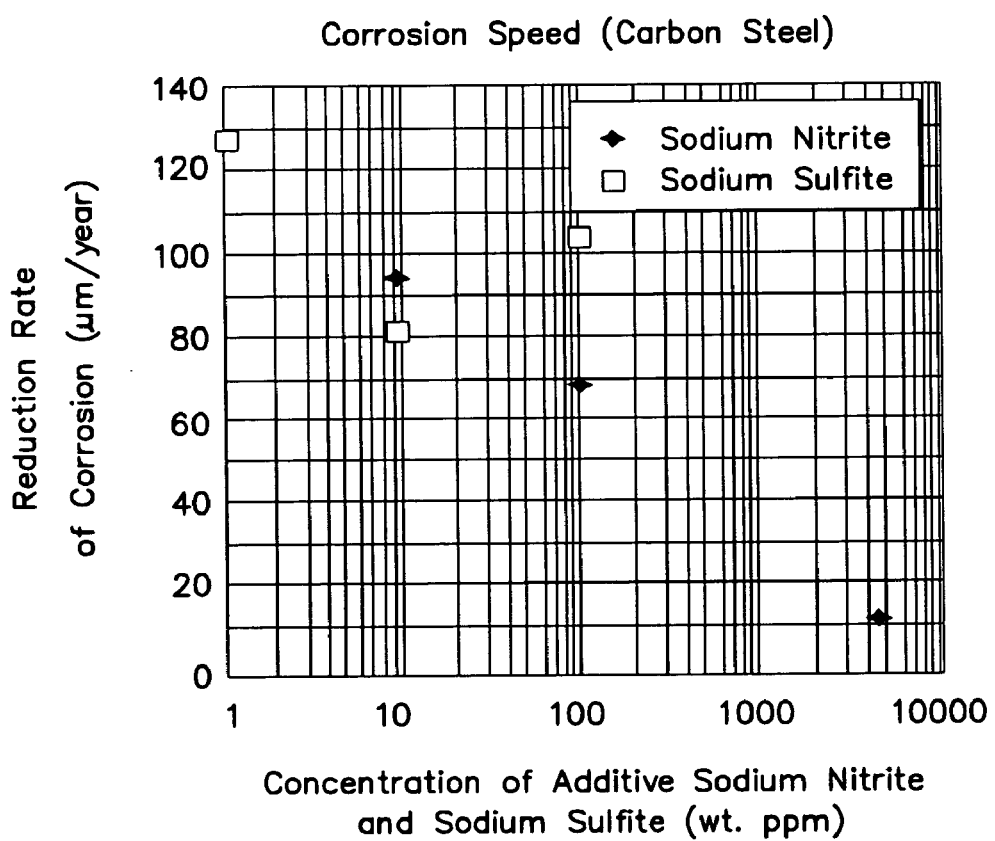
FIG. 17 is a graph showing the effect of corrosion prevention of sodium nitrite and sodium sulfite on carbon steel samples in the Experimental Example 2 of the Best Mode B according to the present invention.
Figure 18:
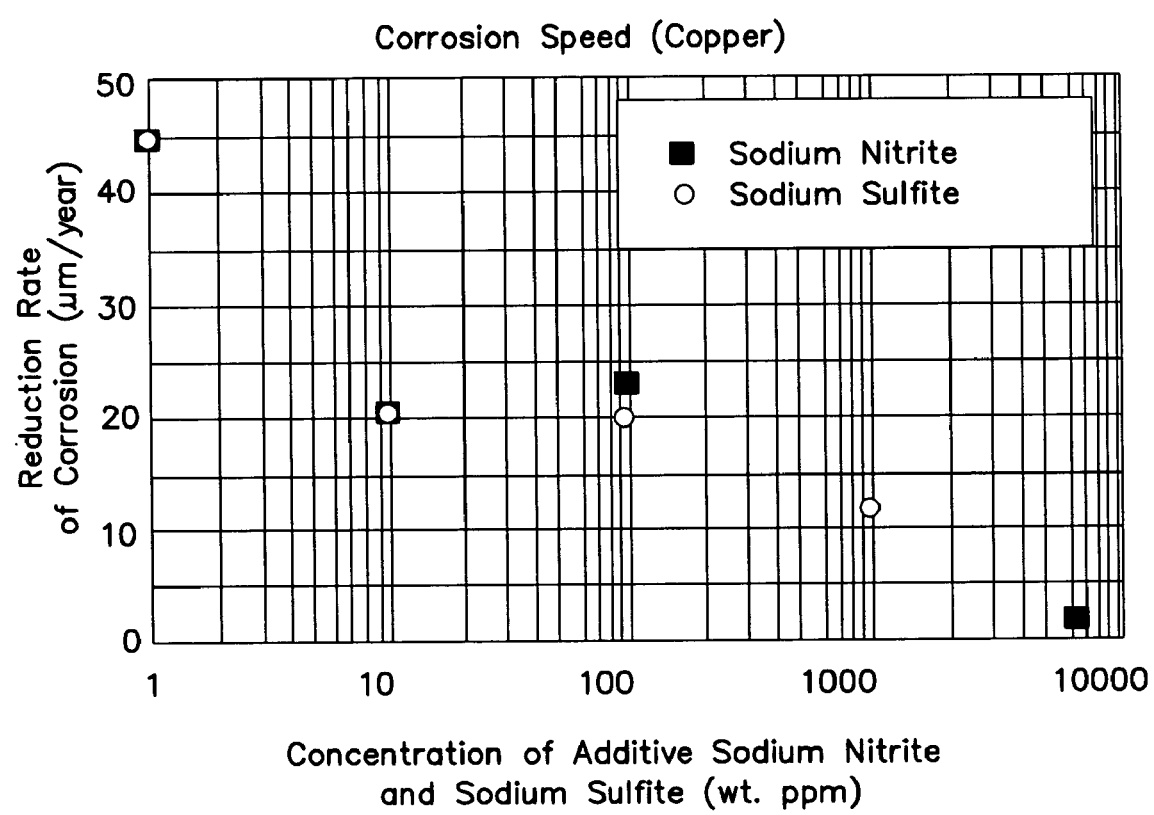
FIG. 18 is a graph showing the effect of corrosion prevention of sodium nitrite and sodium sulfite on copper samples in the Experimental Example 2 of the Best Mode B according to the present invention.

The TBAB was dissolved in water to a concentration of 25-wt. %. Sodium nitrite or sodium sulfite was added to thus prepared TBAB aqueous solution at various concentration levels. Experiment similar with the Experimental Example 1 was given to thus prepared solutions. FIG. 17 shows the result on carbon steel sample, and FIG. 18 shows the result on copper sample.

These results show that both sodium nitrite and sodium sulfite give almost equal excellent corrosion-preventive effect to both carbon steel and copper, and, particularly to copper, they reduce the corrosiveness of TBAB aqueous solution to equivalent level of hot water corrosiveness by adding them by max. 5,000 wt. ppm.

Best Mode C

According to the Best Mode C, the aqueous solution containing tetra-n-butylammonium bromide (hereinafter referred to simply as TBAB) preferably contains TBAB to a range of from 10 to 26 wt. %. According to the Best Mode C, the aqueous solution containing TBAB is preferably cooled to a temperature range of from 5° C. to 8° C.

The Best Mode C is described in detail in the following.

The secondary hydrate of TBAB has larger heat capacity than that of the primary hydrate at a significance level. FIG.

Figure 19:
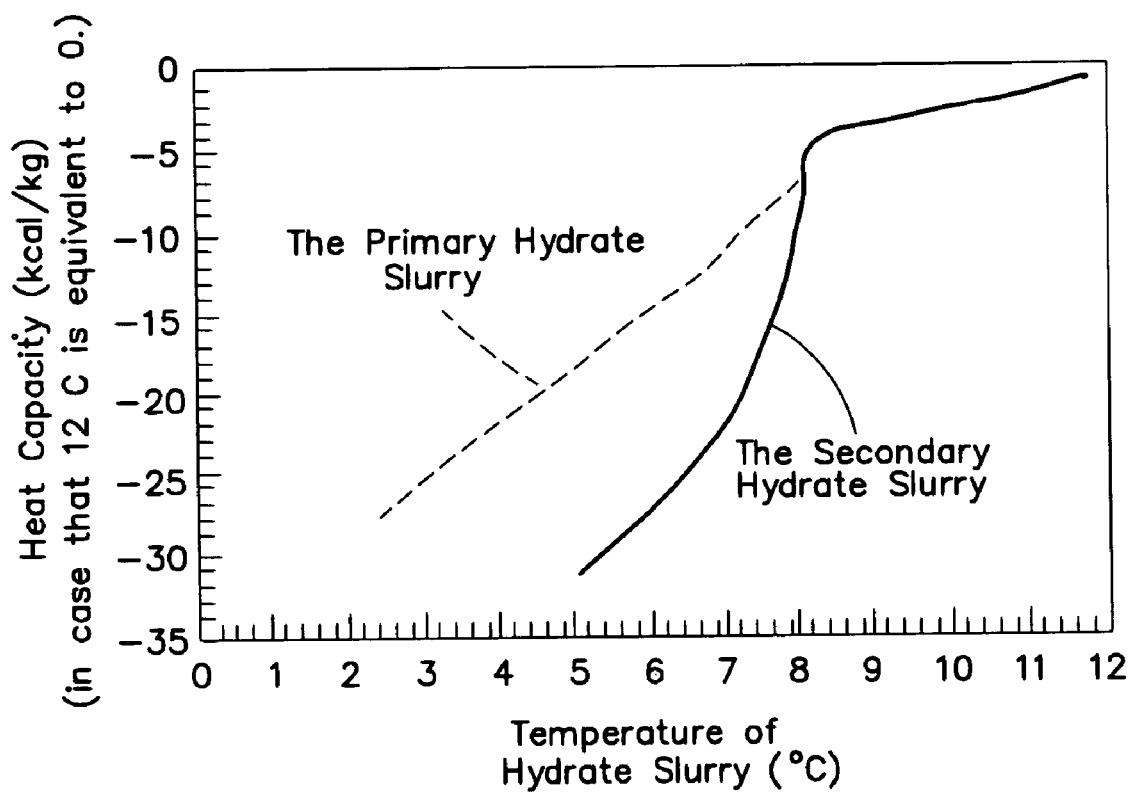
FIG. 19 is a graph showing the relation between the heat capacity of hydrate and the temperature of hydrate slurry, on generating the first hydrate and the second hydrate by cooling a TBAB aqueous solution containing 20 wt. % of TBAB, of the Best Mode C according to the present invention.

19 is a graph showing the heat capacity of primary hydrate and of secondary hydrate in relation with the temperatures of slurry of respective hydrates for the case of generating the primary hydrate and the secondary hydrate by cooling a 20 wt. % TBAB aqueous solution, which graph was prepared by the inventors of the present invention. FIG. 19 shows that the primary hydrate has about 14 kcal/kg of heat capacity at 6° C., for example, and the secondary hydrate has about 27 kcal/kg of heat capacity, which is a significant difference, (or about double the former value, in this case).

That is, when the TBAB hydrate slurry is used as the thermal storage medium, efficient generation of the secondary hydrate is advantageous.

Figure 20:
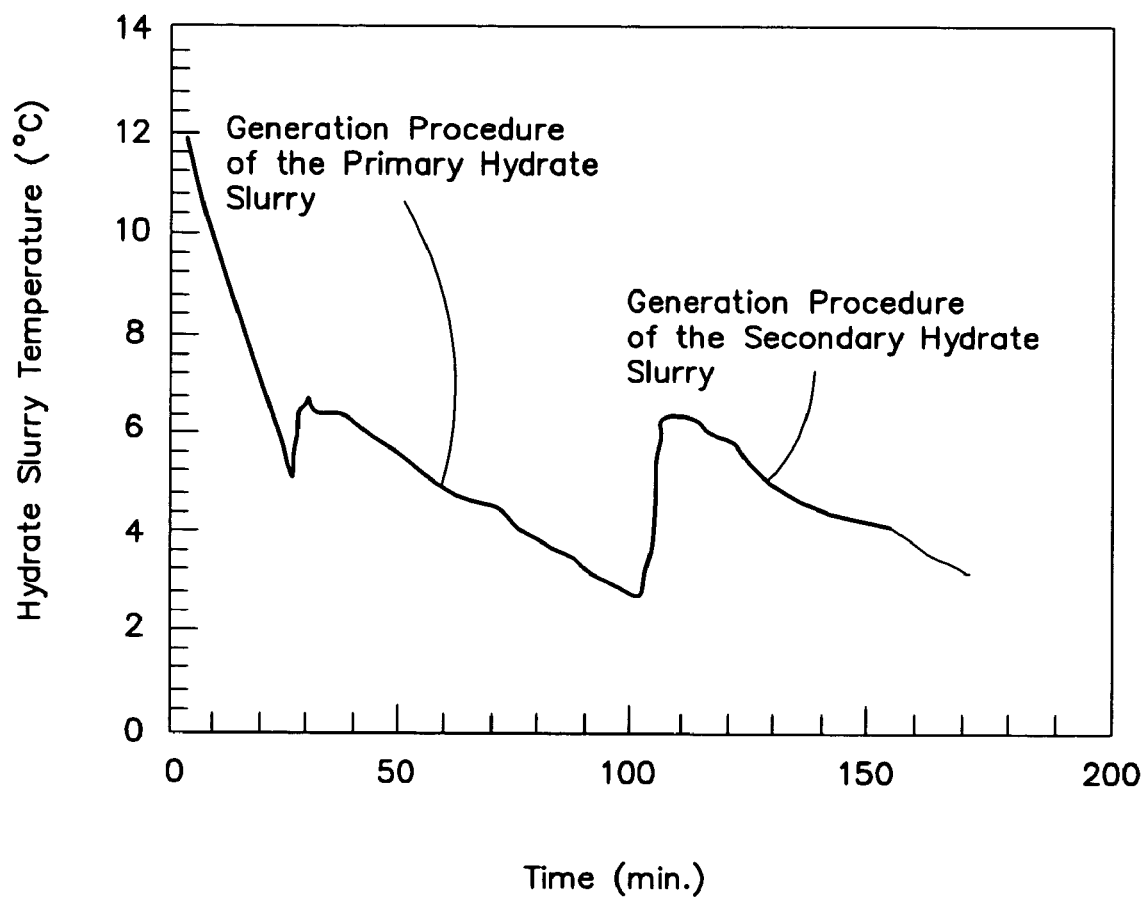
FIG. 20 is a graph showing the process of generation of TBAB hydrate slurry by cooling aqueous solution of 17 wt. % TBAB of the Best Mode C according to the present invention.

Although the secondary hydrate is generated when the TBAB aqueous solution is cooled to 8° C. or below, the primary hydrate continues the generation even when the TBAB aqueous solution becomes 8° C. or below, which is a supercool phenomenon of the primary hydrate. FIG. 20 is a graph showing the process of generation of TBAB hydrate slurry when the 17 wt. % TBAB aqueous solution is cooled, which graph was prepared by the inventors of the present invention. As seen in FIG. 20, when the TBAB aqueous solution is cooled from around 12° C., the super-cool of the TBAB aqueous solution vanishes after about 25 minutes to generate the primary hydrate slurry. After about 100 minutes when the primary hydrate slurry is further cooled to about 3° C., the supercool of the primary hydrate vanishes to generate the secondary hydrate. On transferring from the generation of primary hydrate slurry to the generation of secondary hydrate slurry, if the degree of supercool of the primary hydrate slurry is excessive, the temperature for cooling the TBAB aqueous solution is required to set to a low temperature level, which reduces the coefficient of performance of the refrigerating machine. To compensate the reducing coefficient of performance, the heat transfer area has to be increased, which leads to increase in the size of heat exchanger and to increase in cost. Therefore, it is advantageous to minimize the degree of supercool of the primary hydrate and to efficiently generate the secondary hydrate.

During the course of cooling the TBAB aqueous solution, the inventors of the present invention found that the efficient generation of the secondary hydrate is attained by cooling the TBAB aqueous solution in the initial stage of forming the TBAB hydrate slurry at cooling rates of 6 kcal/hr-kg or more.

According to the Best Mode C, the concentration of TBAB aqueous solution is particularly preferable in a range of from 10 to 26 wt. % in view of the heat capacity of the thermal storage medium consisting of the generated hydrate slurry. (For reference, the heat capacity of the secondary hydrate at 10% TBAB concentration is 7 kcal/kg at 5° C., and that at 26% TBAB concentration is 42 kcal/kg at 5° C.) With similar viewpoint, the TBAB aqueous solution is preferably cooled to a range of from 5° C. to 8° C. A TBAB hydrate slurry prepared by cooling a TBAB aqueous solution containing 10 to 26 wt. % of TBAB from, for example, 12° C., which is within a temperature range of 5° C. to 12° C. used by general storage air conditioners, to a range of from 5° C. to 8° C. at the above-described cooling rate can store and transport heat ranging from 14 to 42 Mcal/m³ corresponding to about 1 to 6 times the stored heat transport density of water. That is, very large density of heat can be stored and transferred under the condition of 26-wt. %, secondary hydrate, and 5° C. Specifically, when the initial concentration of TBAB aqueous solution is in a range of from 10 to 22 wt. %, and when the temperature of the secondary hydrate slurry of TBAB is 5° C., the slurry is able to have a heat capacity corresponding to about four times that of water. When the initial concentration of TBAB aqueous solution is in a range of from 18 to 26 wt. %, the slurry is able to have a heat capacity corresponding to four times that of water even when the temperature of secondary hydrate slurry of TBAB is at 8° C.

The slurry of thermal storage medium according to the Best Mode C may contain a compound such as ethylene glycol having lower solidification temperature than that of water for adjusting temperature, a corrosion inhibitor such as sodium nitrite and sodium sulfite for preventing corrosion of piping structuring the circulation system, and/or a surfactant such as cationic surfactant (such as stearyl trimethylammonium chloride, cetyl trimethylammonium chloride) for reducing pressure drop in piping.

Cooling of TBAB aqueous solution according to the Best Mode C may be given at the cooling rate to the TBAB aqueous solution from the beginning of the cooling, or may be given from the initial stage that generates the primary hydrate.

Figure 21:
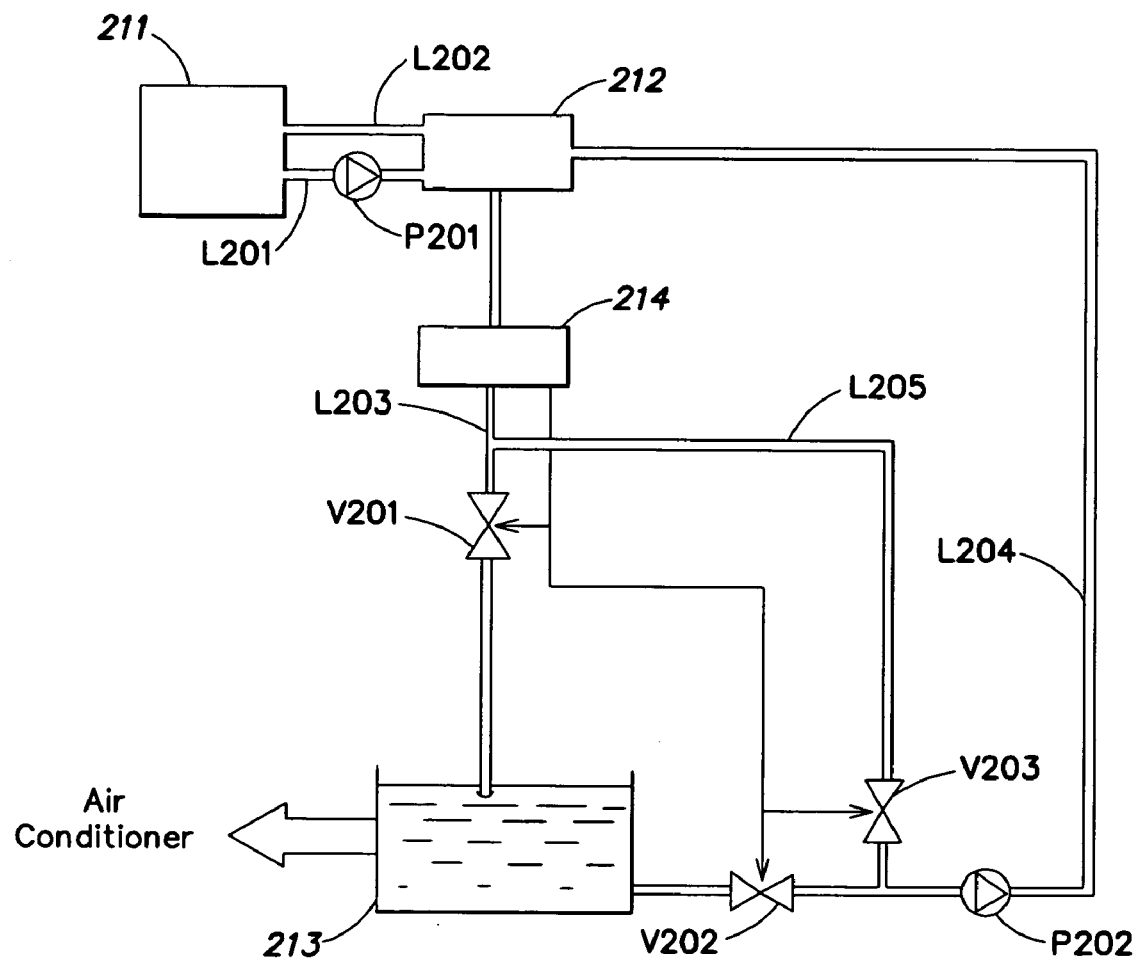
FIG. 21 is a block diagram of an example of the thermal storage system applying the method of the Embodiment of the Best Mode C according to the present invention.

FIG. 21 is a block diagram showing an example of thermal storage system according to the Best Mode C. The thermal storage system given in FIG. 21 has a refrigerating machine 211, a heat exchanger 212 for producing TBAB hydrate slurry, and a storage tank 213. There are a line L201 between the refrigerating machine 211 and the heat exchanger 212 for charging the brine cooled by the refrigerating machine 211 to the heat exchanger 212, and a line L202 therebetween for circulating the heat-exchanged brine from the heat exchanger 212 to the refrigerating machine 211. A brine transfer pump P201 is installed in the line L201.

A line L203 connects the heat exchanger 212 and the storage tank 213. A hydrate identifier 214 is located in the line L203, and a valve V201 is positioned at downstream side of the hydrate identifier 214.

A line L204 connects the storage tank 213 and the heat exchanger 212. A valve V202 is located in the line L204, and a circulation pump P202 is positioned at downstream side of the valve V202.

On the line L203, a branch line L205 is given between the identifier 214 and the valve V201. The branch line L205 is connected with the line L204 between the valve V202 and the circulation pump P202. A valve V203 is located in the line L205.

On operating the thermal storage system, brine cooled in the refrigerating machine 211 to, for example, 2° C. is circulated to the heat exchanger 212. At the same time, the TBAB aqueous solution AS held in the storage tank 213 is circulated from the heat exchanger 212, the identifier 214, and to the storage tank 213 via the line L204 and the line L203 using the circulation pump P202, (the first circulation system). During the circulation of the TBAB aqueous solution, the identifier 214 identifies the generation state of the hydrate slurry. The heat-exchanged brine is circulated to the refrigerating machine 211 to be cooled as described above.

If the generated hydrate in the slurry is identified as the primary hydrate, a command generated from the identifier 214 orders the valve V201 to close and the valve V203 to open. Thus, the route of the primary hydrate slurry to the storage tank 213 is shut, and the primary hydrate slurry is circulated to the heat exchanger 212 and the identifier 214 via the line L204, the line L203, and the line L205, respectively, (the second circulation system). When the circulation system is changed as described above, the quantity of the TBAB aqueous solution (slurry) in the second circulation system becomes less than that in the first circulation system, so the cooling rate per unit mass in the heat exchanger 212 is increased.

When the generation of secondary hydrate is detected by the identifier 214, a command generated from the identifier 214 orders the valve V201 and the valve V202 to open, and orders the valve V203 to close, thus changing the circulation system of the hydrate slurry from the second circulation system to the first circulation system. As a result, the secondary hydrate exists in the second circulation system. During the process to generate the secondary hydrate in the heat exchanger 212, the secondary hydrate is rapidly generated, and the TBAB hydrate slurry is stored in the storage tank 213. Thus stored TBAB can be used during daytime in, for example, air conditioners.

The identifier 214 is provided with, for example, an instrument that determines a physical property, which differs between the primary hydrate and the secondary hydrate. When the physical property determined by the instrument exceeds a specified threshold value, or when the generation of secondary hydrate is detected, the above-described command is generated. For example, since the density of the primary hydrate is about $1.08 \times 10^3$ kg/m$^3$, and the density of the secondary hydrate is about $1.03 \times 10^3$ kg/m$^3$, the above-described instrument may be a densitometer. Also, since the solid content of the primary hydrate slurry is significantly smaller than that of the secondary hydrate slurry, each of the hydrates differs in the viscosity significantly to each other, so the instrument may be a viscometer. An electrolytic conductivity detector, an electrostatic capacity meter, an electric resistance meter, or the like may do the method for identification.

The cooling rate may be regulated by the circulation rate of the TBAB aqueous solution using the pump P202.

According to the Best Mode C, since the supercool phenomenon of the primary hydrate is not generated as described before, the coefficient of performance of the refrigerating machine increases, and the temperature difference between the cooling water (brine) for cooling the TBAB aqueous solution and the generated hydrate slurry can be maintained at a large value. Therefore, the heat transfer area of the heat exchanger can be reduced, and the compact design and the cost reduction of the heat exchanger can be attained. Furthermore, according to the Best Mode C, the TBAB aqueous solution is necessarily cooled only to temperature level ranging from about 5° C. to about 8° C., so commonly using water or brine can be used by cooling as the cooling liquid for generating the hydrate slurry. In addition, the Best Mode C can be applied in a temperature range of from 5° C. to 12° C., which is a range of commonly used by the cooling storage air conditioning system.

The Best Mode C is described below referring to example. The Best Mode C is, however, not limited by these examples.

EXPERIMENTAL EXAMPLE

A TBAB aqueous solution of 20 wt. % TBAB was cooled at rates of 6 kcal/hr-kg or more, and the temperatures of generated hydrate slurry were determined with the cooling time, also the exchanged heats (kcal/hr-kg) per 1 kg of generated hydrate slurry were determined with time. The result is shown in FIG. 22.

As a comparative example, similar TBAB aqueous solution was cooed at a rate of 2 kcal/hr-kg to give similar measurement as above. The result is shown in FIG. 23.

Figure 22:
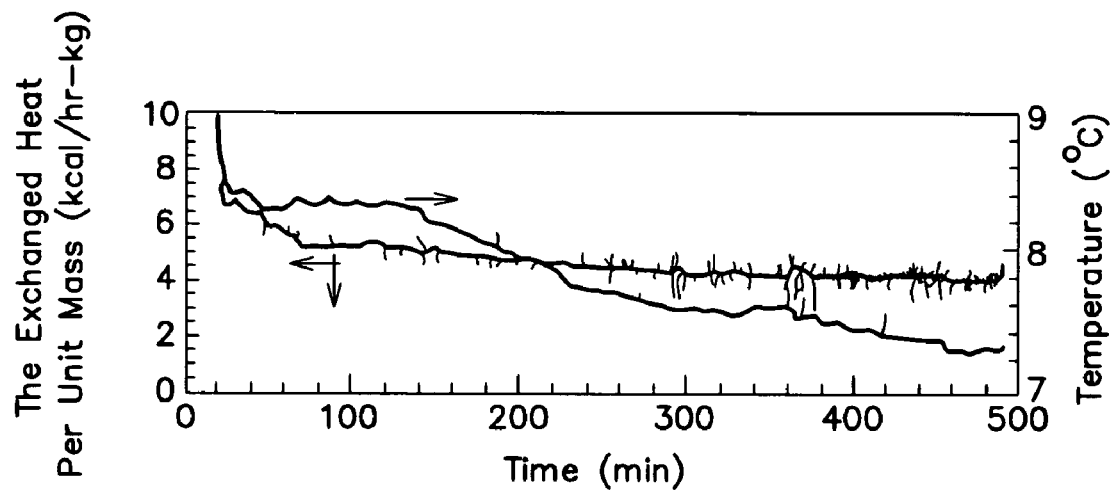
FIG. 22 is a graph showing the result of the Experimental Example of the present invention of the Best Embodiment C according to the present invention.

As seen in FIG. 22, when the TBAB aqueous solution was cooled at rates of 6 kcal/hr-kg or more, the primary hydrate was generated after about 30 minutes, and after that, with the cooling rate of 6 kcal/hr-kg or more, the temperature of the hydrate slurry kept to around 8° C. for about 120 minutes. During the constant temperature period, the generation of primary hydrate changed to the generation of secondary hydrate. That is, when the TBAB aqueous solution is cooled at rates of 6 kcal/hr-kg or more, the secondary hydrate slurry can be produced during the initial stage of generating hydrate slurry. After completely changed to the secondary hydrate slurry, the temperature of the secondary slurry begins to reduce.

Figure 23:
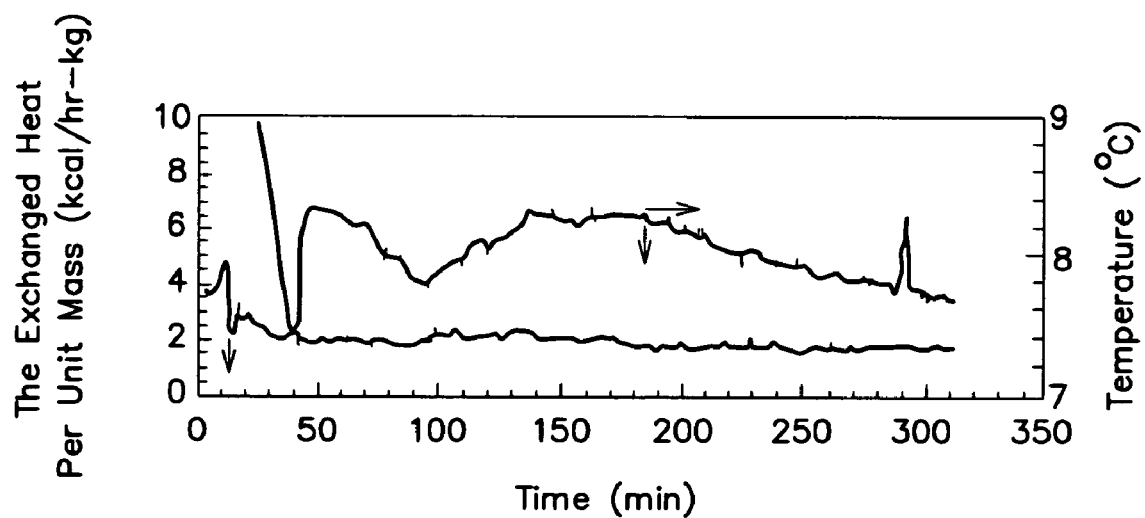
FIG. 23 is a graph showing the result of the Experimental Example of a comparative example of the Best Mode C according to the present invention.

To the contrary, as shown in FIG. 23, when the cooling rate after generated the primary hydrate slurry was 2 kcal/hr-kg, supercool phenomenon of the primary hydrate slurry distinctively appeared up to about 80 minutes, and, after that, the supercool phenomenon of the primary hydrate slurry vanished to enter the process of generating secondary hydrate, then the behavior of the solution followed similar pattern with that in FIG. 22.

Best Mode D

On preparing hydrate slurry, to prevent supercooling, it is effective to disperse and float nucleus particles in the aqueous solution, which nucleus particles function as the nuclei of the hydrate particles. The fine particles as nuclei are particularly effective when they have 10 μm or smaller size. Those fine particles are easily dispersed and floated in aqueous solution so that they become nuclei of hydrate particles and that they have very strong effect of preventing supercooling.

If the concentration of the fine particles having 10 μm or smaller size is 0.1 mg/l or more, they sufficiently contact with aqueous solution and they are effective to prevent supercooling. Since normal drinking water has Grade 1 of turbidity, and industrial water has around Grade 20 of turbidity, (1 mg-kaolin/l is defined as Grade 1 of turbidity), these drinking water and industrial water contain 0.1 mg/l or more of fine particles. The supercool can be prevented by using drinking water or industrial water as the water for aqueous solution containing guest compound. If the fine particles having 10 μm or smaller size are used as the nucleus particles, the upper limit of the concentration thereof in the aqueous solution is around 100 mg/l. If the fine particles exceeding the upper limit are dispersed and floated in the aqueous solution, the heat transfer performance of the heat exchanger degrades, which is not preferable.

When the fine particles as the nucleus fine particles have 100 μm or smaller size, the effect to prevent supercooling is enhanced by agitating the aqueous solution to disperse and float the fine particles therein. Adequate range of the concentration of fine particles in aqueous solution is from 1 mg/l to 5 g/l. If the concentration exceeds the upper limit, drift or stagnant zone likely appears in the apparatus for generating hydrate slurry, which is not favorable. If the concentration is less than the lower limit, the effect to prevent supercooling becomes weak.

Figure 24:
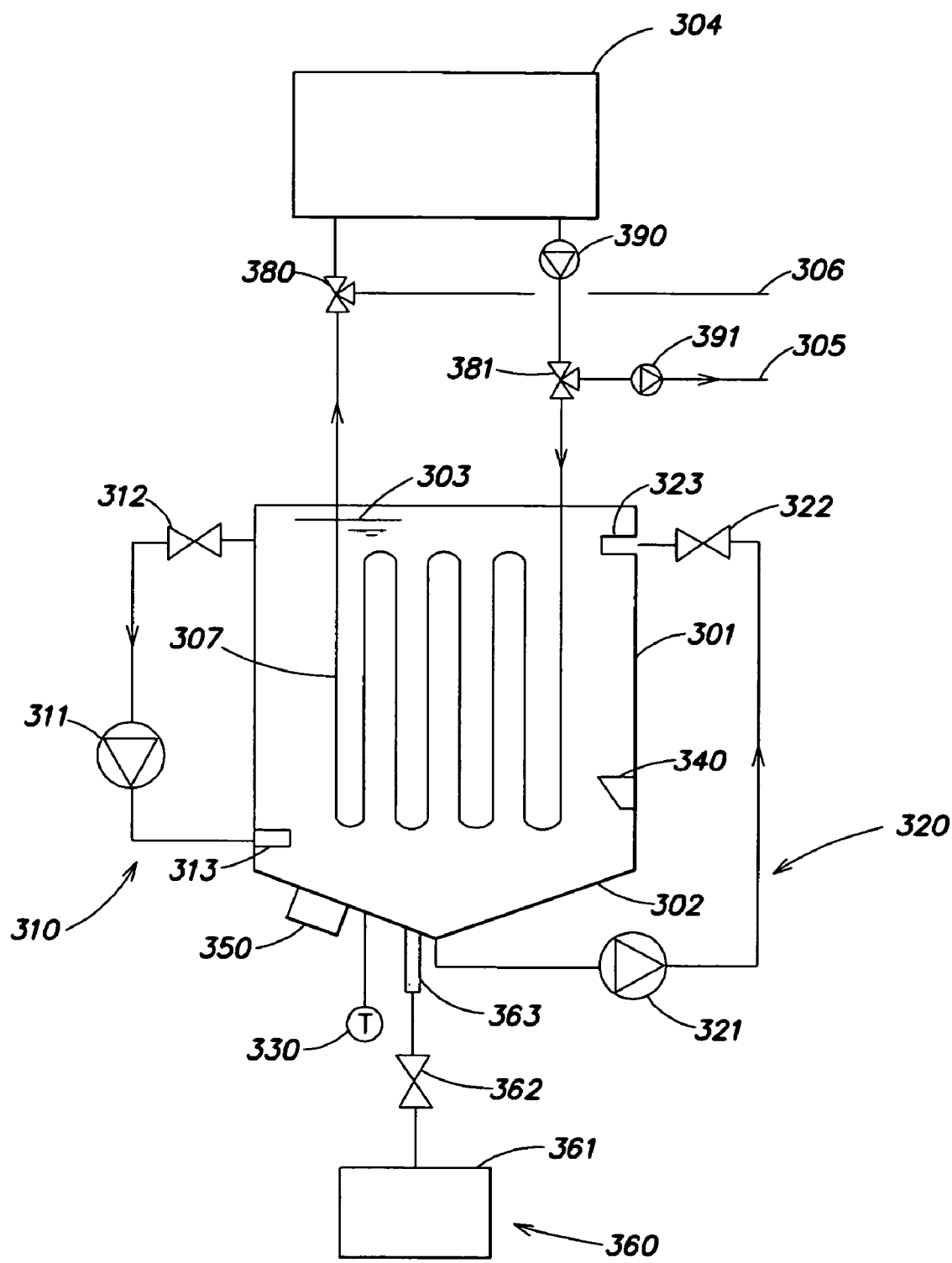
FIG. 24 shows a schematic drawing of the First Embodiment of the hydrate thermal storage medium of the Best Mode D according to the present invention.

The Best Mode D is described below while describing the apparatus and the functions of the apparatus of the Best Mode D referring to the drawings. FIG. 24 shows a schematic drawing of the First Embodiment of the hydrate thermal storage medium according to the Best Mode D. The apparatus according to the Best Mode D generates hydrate and stores heat by cooling an aqueous solution containing a guest compound such as TBAB.

A tank 301 is for storing heat, and has, for example, cylindrical shape giving a reverse-cone shape at a bottom section wall 302 thereof. For example, an aqueous solution 303 of TBAB described above is held in the tank 301.

A refrigerating machine 304 produces low temperature coolant using, for example, electricity or waste heat, and supplies the low temperature coolant to a cold heat load-side (not shown) such as air-conditioner via a supply pipe 305, further recovers the coolant via a return pipe 306, thus circulates the coolant between the refrigerating machine 304 and the cold heat load-side.

A generation heat exchanger 307 is located in the tank 301 to generate hydrate by cooling the aqueous solution. The low temperature coolant is supplied and circulated from the refrigerating machine 304 to the generation heat exchanger 307 to cool the aqueous solution 303 to generate the hydrate particles. The hydrate slurry containing thus generated hydrate particles is held in the tank 301 to stored heat.

According to the Best Mode D, the refrigerating machine 304 is operated by midnight surplus power or the like to produce low temperature coolant, which coolant passes through the generation heat exchanger 307 to cool the aqueous solution in the tank 301 to produce the hydrate slurry and stored heat. During the period of large consumption of cold heat in daytime, the stored cold heat is recovered using the generation heat exchanger 307, and is used as a part or whole of the cold heat being supplied to the cold heat load-side, thus achieving the effective usage of energy resources.

The method for preventing supercooling in the case that the aqueous solution in the tank 301 is cooled to generate hydrate is described below while describing the apparatus and function thereof. As described above, fine particles are mixed into the aqueous solution 303, in advance. It is preferable that the fine particles have the same specific gravity with that of water or have very small size, 10 µm or less, from the viewpoint to maintain the state of dispersing and floating over the whole area of the aqueous solution 303. Nevertheless, while repeating the generation and melting of hydrate, the fine particles tend to sediment at the bottom of the tank, as described before, and tend to decrease the quantity of dispersed and floated fine particles.

To this point, the Best Mode D adopts granulated slag particles as the fine particles. The granulated slag particles are inexpensive and give large effect of preventing super-cooling. The granulated slag has larger specific gravity than that of TBAB aqueous solution, and they have a precipitating characteristic. The Best Mode D, however, selects the granulated slag particles having slow sedimenting speed within a range of not degrading the performance of preventing super-cooling, or, for example, those having around several millimeters a minute of the sedimenting speed.

The tank 301 is provided with an aqueous solution circulation mechanism 310. A pump 311, a valve 312 structures the aqueous solution circulation mechanism 310, and an ejection nozzle 313 positioned at bottom side wall of the tank 301, and other components. The aqueous solution is sucked from upper section of the tank 301 and is ejected from the ejection nozzle 313.

The aqueous solution ejected from the ejection nozzle 313 circulates in the tank 301. The circulation flow of the aqueous solution is analyzed in advance, and designed to establish the conditions that the flow speed of the aqueous solution exceeds the sedimenting speed of the fine particles even at the zone of lowest flow speed of the aqueous solution, for example, at corners of the tank 301, thus dispersing again the fine particles transferred to the bottom section of the tank 301 to prevent occurrence of precipitation of fine particles at the bottom of the tank 301.

Consequently, owing to the circulation flow of aqueous solution in the tank 301, the fine particles are kept in their dispersed and floated state over the whole area of the aqueous solution, and the quantity of fine particles floating in the aqueous solution does not decrease, thus assuring effective preventing super-cooling. According to the apparatus and the method, for maintaining the fine particles in dispersed and floated state, only the aqueous solution component of the hydrate slurry may be circulated at a relatively low speed, which consumes less power, or energy, thus avoiding the degradation of energy serving effect which is an object of the thermal storage medium.

As described above, the fine particles are kept in their floating state owing to the circulation flow in the tank 301. Therefore, above-described granulated slag particles, which have large effect of preventing super-cooling, can be applied as the fine particles in spite of their sedimenting property, and there is no specific limitation on the material and particle size of the fine particles.

The above-described Best Mode D deals with the case of circulation of aqueous solution inside the tank 301. Actual flow pattern in the tank 301 is, however, complex, and the circulation flow may give irregular flow patterns, or what is called the "agitation".

According to the Best Mode D, adding to the above-given mechanism, plurality of mechanisms for enhancing the dispersion and floating of fine particles is adopted. One of these kinds of mechanisms is a bottom section circulation mechanism 320 mounted to the tank 301.

A pump 321, a valve 322, structures the bottom section circulation mechanism 320, an ejection nozzle 323 located at upper side wall of the tank 301, and other components. The aqueous solution is sucked from the bottom center of the bottom wall section 302, or the lowermost part, of the tank 301, and is ejected into the aqueous solution in the tank 301 from the ejection nozzle 323 to distribute the solution.

As described before, since the fine particles tend to sediment at the bottom section of the tank 301, the aqueous solution at bottom section thereof contains large quantity of fine particles. By sucking the aqueous solution of the bottom section to disperse into the aqueous solution at upper section thereof, the fine particles are effectively dispersed and floated in the aqueous solution.

A temperature detection mechanism 330 is located at bottom section of the tank 301. The temperature detection mechanism 330 detects the temperatures of aqueous solution to determine the generation of super-cool in the aqueous solution in the tank 301. A controller (not shown) processes the signals generated from the temperature detection mechanism 330. Only when the super-cool appeared, the controller actuates the bottom section circulation mechanism 320.

As described above, supercool appears when the quantity of fine particles floating in the aqueous solution decreases, or when large quantity of fine particles sediment at the bottom of the tank 301. Therefore, only in that case, the bottom section circulation mechanism 320 is actuated to let the aqueous solution containing large quantity of fine particles disperse in the aqueous solution to further effectively disperse and float the fine particles in the aqueous solution. Accordingly, the bottom section circulation mechanism 320 does not necessarily operate all the time, thus further reducing the power consumption.

To a part of the aqueous solution circulation mechanism 310 and the bottom section circulation mechanism 320, additional mechanism to add fresh fine particles or to add an aqueous solution containing fresh fine particles may be applied. The mechanism for adding fresh fine particles may be applied other than to the aqueous solution circulation mechanism 310 and the bottom section circulation mechanism 320.

As another mechanism for dispersing and floating fine particles, a supersonic wave oscillation mechanism 340 is applied to the tank 301. The supersonic wave oscillation mechanism 340 applies supersonic waves to the aqueous solution in the tank 301 to let the fine particles disperse and float in the aqueous solution.

Different from the above-described mechanisms, the supersonic wave oscillation mechanism does not need to circulate, or move, the fine particles along with the aqueous solution, thus the energy necessary to sustain the fine particles in dispersed and floated state is substantially only the energy to move solely the fine particles or to prevent the precipitation of fine particles, which means less energy consumption. Although the efficiency of the supersonic wave oscillation mechanism 340 is naturally taken into account, the mechanism consumes theoretically least amount of energy.

As a separate mechanism for dispersing and floating the fine particles, a vibration mechanism 350 is applied to the tank 301. The vibration mechanism 350 vibrates the bottom wall section 302 of the tank 301 to make the sediment fine particles disperse and float in the aqueous solution. Also the vibration mechanism 350 consumes theoretically small energy for dispersing and floating the fine particles, similar with the supersonic wave oscillation mechanism 340.

An air-injection mechanism 360 is applied to the tank 301 as a mechanism for dispersing and floating the fine particles in aqueous solution. The air-injection mechanism 360 is structured by a high pressure air supply mechanism 361, a valve 362, an ejection nozzle 363 attached to the bottom section of the tank 301, and other components.

The air-injection mechanism 360 supplies air from the bottom section of the tank 301 into the aqueous solution. By thus generated ascending air bubbles through the aqueous solution, the aqueous solution or hydrate slurry is agitated, and the fine particles are dispersed and floated. Since the mechanism also makes the aqueous solution surrounding the generation heat exchanger 307 flow owing to the ascending bubbles, the efficiency of the heat transfer also increases. The reference numbers 380, 381 designate three-way valves, and 390, 391 designate pumps.

Figure 25:
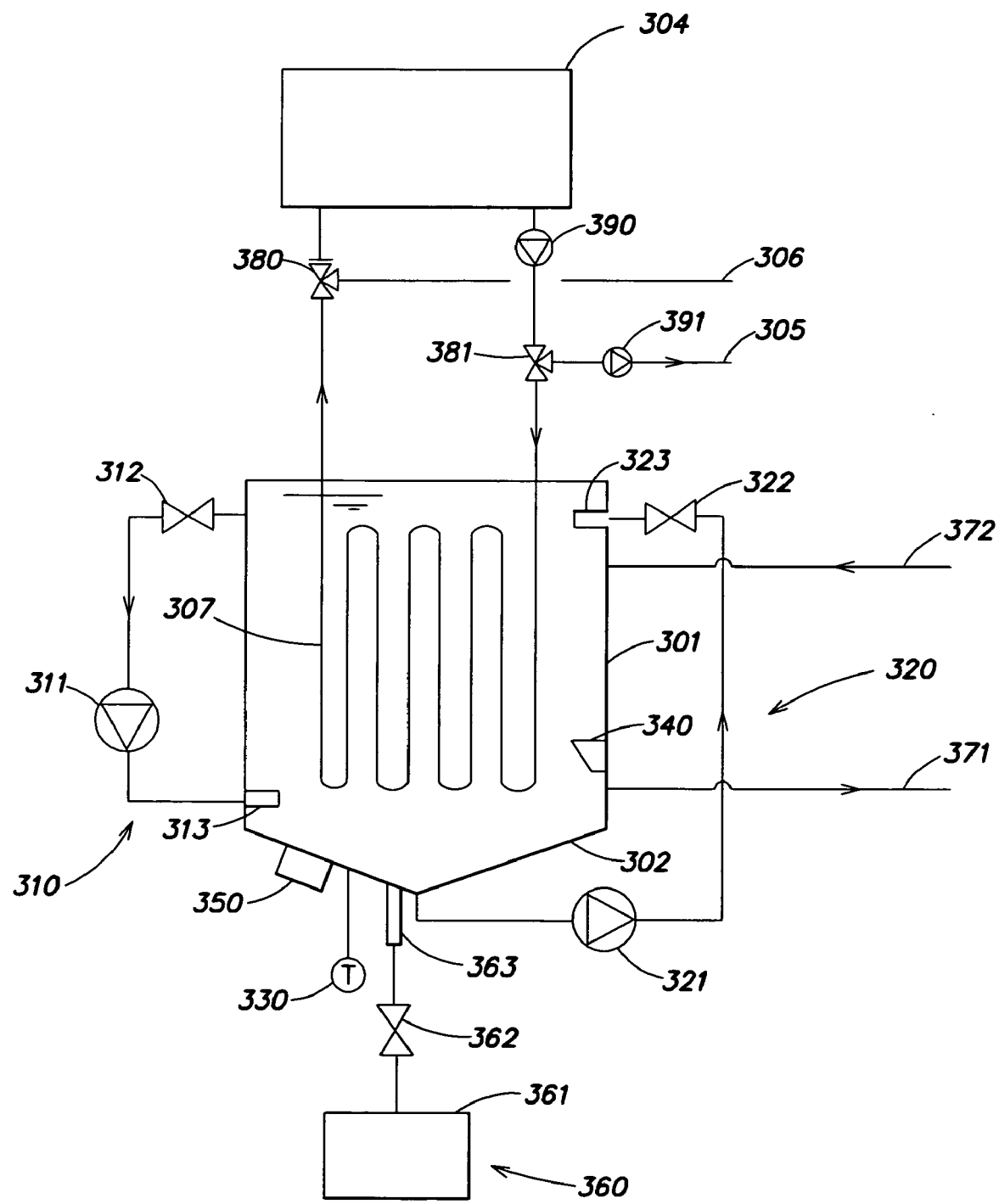
FIG. 25 shows a schematic drawing of the Second Embodiment of the hydrate thermal storage medium of the Best Mode D according to the present invention.

The apparatus of the Best Mode D is not limited to the one applied in the First Embodiment. FIG. 25 shows a schematic drawing of the Second Embodiment apparatus according to the Best Mode D. The Second Embodiment is applied under a condition that a cold heat load-side, which is able to receive hydrate slurry containing fine particles, is available. In that case, the hydrate slurry in the tank 301 is directly supplied and circulated via a supply pipe 371 and a return pipe 372.

The apparatus according to the Second Embodiment has similar configuration with that of the First Embodiment, and the same component with those in the First Embodiment shown in FIG. 25 has the same reference number with that in the First Embodiment, and no further description is given here.

Figure 26:
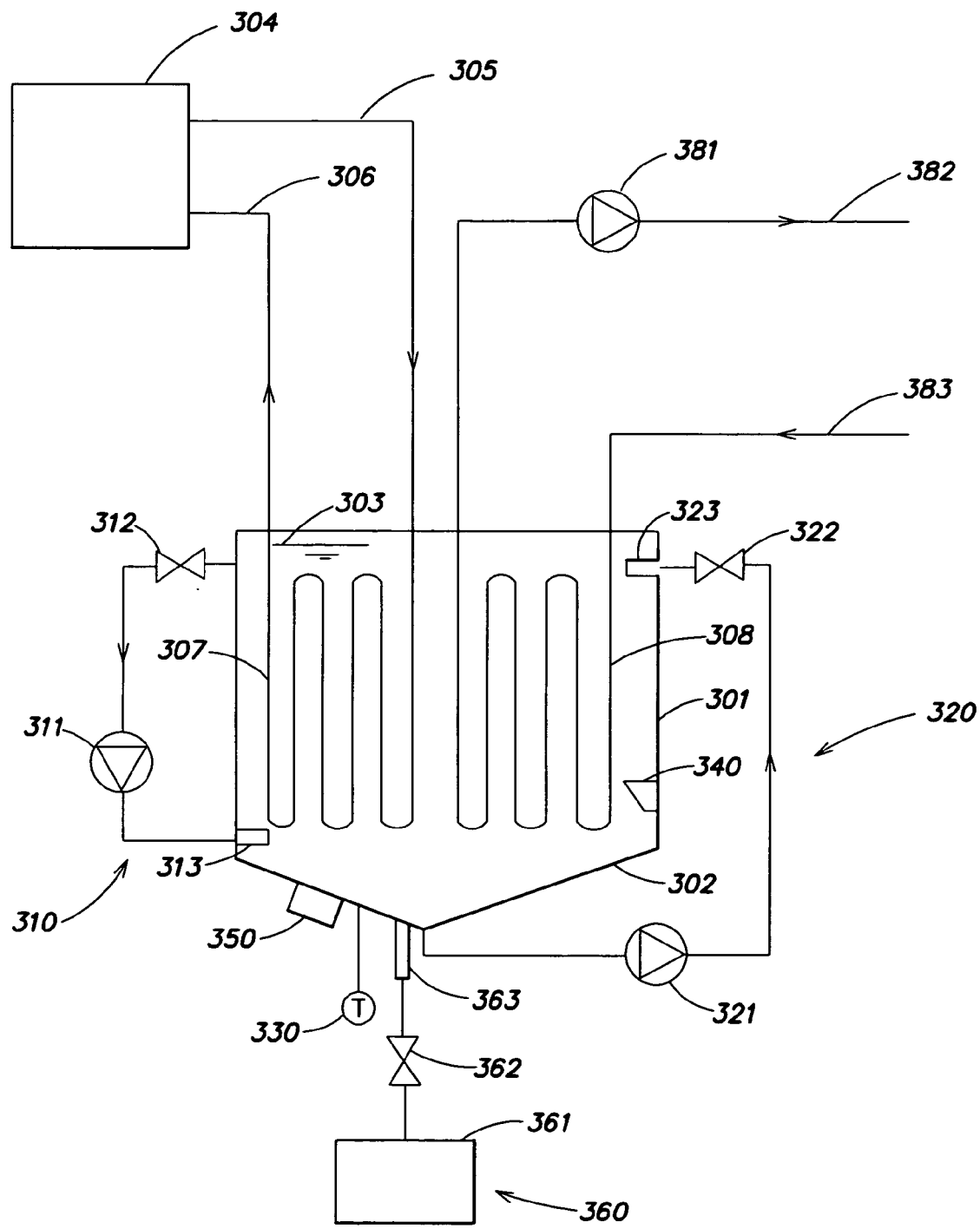
FIG. 26 shows a schematic drawing of the Third Embodiment of the hydrate thermal storage medium of the Best Mode D according to the present invention.

FIG. 26 shows a schematic drawing of the Third Embodiment apparatus according to the Best Mode D. Separate from the generation heat exchanger 307, a supply heat exchanger 380 is located in the tank 301. The supply heat exchanger 308 conducts heat exchange between the hydrate slurry in the tank 301 and the coolant. The coolant is supplied to and is circulated from the cold heat load-side using a pump 381 via a supply pipe 382 and a return pipe 383.

The apparatus according to the Third Embodiment has similar configuration with that of the apparatus of the First Embodiment except for the above-given description, and the same component with that in the First Embodiment shown in FIG. 25 has the same reference number with that in the First Embodiment, and no further description is given here.

The Best Mode D is not limited to the above-described Embodiments. For example, above-described Embodiments have various types of mechanisms for keeping the fine particles disperse and float in the aqueous solution. They are, however, not necessarily applied all of them, and only arbitrary one may be used.

According to the above-described Embodiments, the temperature detection mechanism detects supercool, and the bottom section circulation mechanism is operated only when the super-cool appeared. The bottom section circulation mechanism, however, may be operated always or may be operated over an intermittent period. Also for other mechanisms to disperse and float the fine particles, they may be operated only when the temperature detection mechanism detects supercool.

Best Mode E

Figure 27:
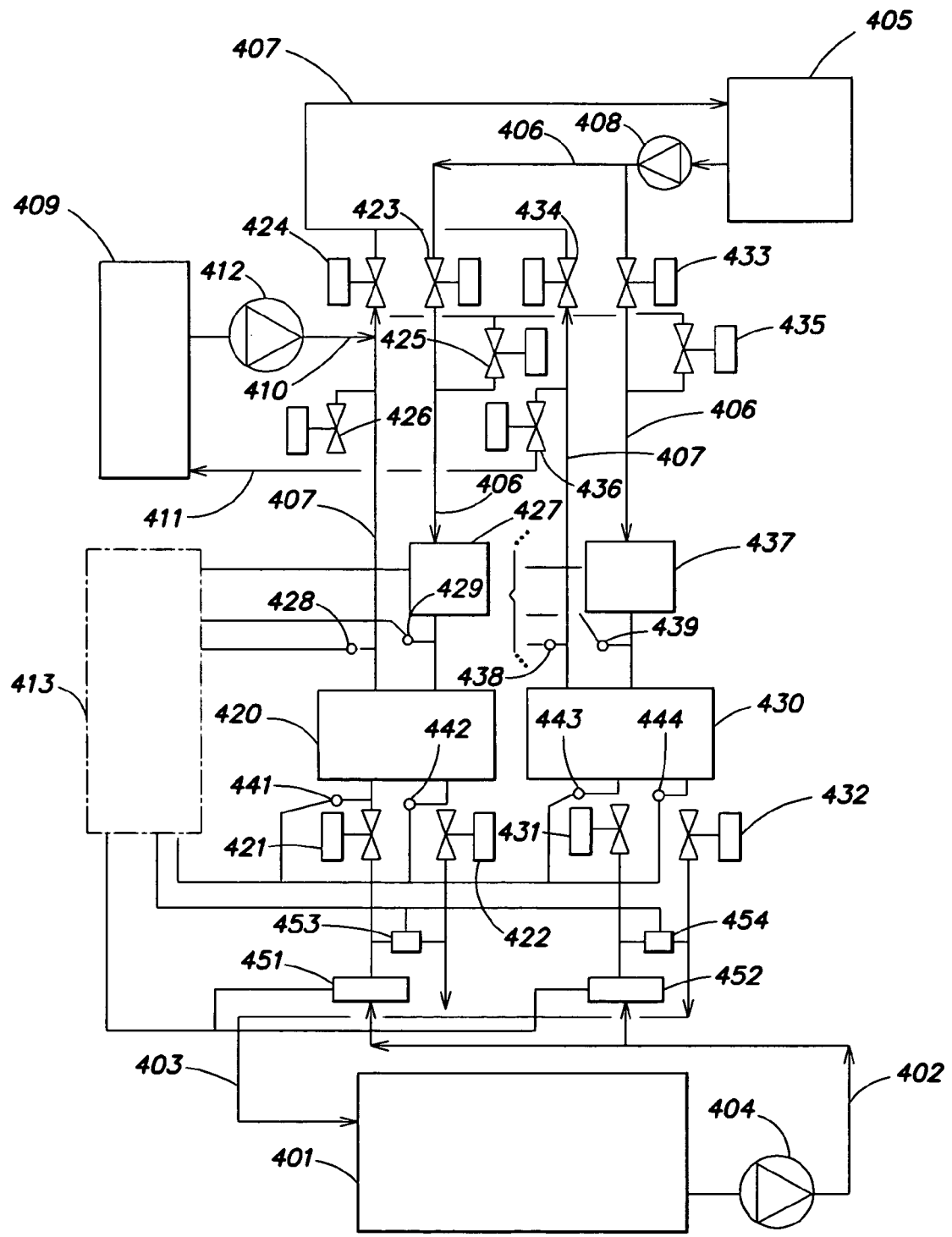
FIG. 27 shows a schematic drawing of the hydrate slurry producing apparatus giving a Embodiment of the Best Mode E according to the present invention.

FIG. 27 shows the configuration of a hydrate slurry producing apparatus according to the Best Mode E. The reference number 401 designates an storage tank holding an aqueous solution in which a hydration agent (for example, tetra-n-butylammonium bromide) is dissolved, the reference number 405 designates a refrigerating machine for cooling a cold water as the coolant, the reference numbers 420, 430 designate plate-type heat exchangers for conducting the heat exchange between the aqueous solution and the cold water. An advantage of a plate-type heat exchanger is high heat transfer performance with less compact area, because a large amount of the heat transfer area per one unit volume is available and because the heat transfer is achieved by the countercurrent mode with the narrow gap of the plate. The reference number 409 designates a hot water tank holding hot water for heating, where the hot water tank 409 contains a heating system.

The aqueous solution in the storage tank 401 circulates the route of a pump 404, a pipeline 402 (supply line), the plate-type heat exchangers 420, 430, and a pipeline 403 (return line). The cold water for cooling the aqueous solution circulates the route of the refrigerating machine 405, a pump 408, a pipeline 406 (supply line), the plate-type heat exchangers 420, 430, and a pipeline 407 (return line). The hot water in the hot water tank 409 circulates the route of a pump 412, a pipeline 410 (supply line), a pipeline 406, the plate-type heat exchangers 420, 430, a pipeline 407, and a pipeline 411 (return line).

At respective inlets and outlets for the cold water located at respective heat exchangers 420, 430, cutoff valves 423, 424, 433, 434 to shut the channel of the respective pipelines are attached. Furthermore, branch pipelines are located between respective cold water cutoff valves and heat exchangers. The branch pipelines are connected with respective hot water pipelines 410, 411 for heating via respective hot water cutoff valves 425, 426, 435, 436 to shut the flow of respective branch pipelines. The respective inlets and outlets of the aqueous solution pipelines of respective heat exchangers 420, 430 are provided with respective aqueous solution cutoff valves 421, 422, 431, 432 to shut the channel of the respective aqueous solution pipelines.

At respective inlets and outlets of cold water on the respective heat exchangers 420, 430, thermometers 428, 429, 438, 439 are mounted to determine the temperatures of cold water. At respective inlets of the cold water on respective heat exchangers 420, 430, flow meters 427, 437 are mounted to determine the flow rate of cold water. At respective inlets and outlets of the aqueous solution on respective heat exchangers 420, 430, thermometers 441, 442, 443, 444 are mounted to determine the temperatures of the aqueous solution.

At respective inlets of the aqueous solution on respective heat exchangers 420, 430, flow meters 451, 452 are mounted to determine the flow rate of the aqueous solution. Differential pressure gages 453, 454 are mounted between the inlets and the outlets of the aqueous solution at respective heat exchangers 420, 430, to determine the pressure difference of the aqueous solution.

A processing and controlling section 413 is applied to acquire the observed data from the thermometers 428, 429, 438, 439, 441, 442, 443, 444, from the flow meters 427, 437, 451, 452, and from the differential pressure gauges 453, 454, and to calculate the amount of exchanged heat (=temperature difference×flow rate×specific heat), thus controlling the respective cutoff valves responding to the obtained temperature, amount of exchanged heat, or flow rate and pressure difference of the aqueous solution.

The method for producing hydrate slurry using the apparatus is described below.

The aqueous solution in the storage tank 401 is pumped by the generation pump 404 to pass through the pipeline 402, the plate-type heat exchangers 420, 430, then to return to the storage tank 401 via the pipeline 403. The cold water cooled by the refrigerating machine 405 is pumped by the pump 408 to pass through the pipeline 406 and the plate-type heat exchangers 420, 430, then to return to the refrigerating machine 405 via the pipeline 407. In the course of the circulation, the aqueous solution is cooled by the cold water in the plate-type heat exchangers 420, 430, across the respective plate-type cooling surfaces, thus producing hydrate slurry.

Three units of heat exchangers are prepared, and two of them are operated, leaving one as stand-by unit. When the pressure drop increases, one of the operating units is switched to the stand-by unit to continue the operation of heat exchange. Even four or five units are operating, one unit is spared as stand-by unit. For example, in case those two units of plate-type heat exchangers are operated, initially almost equal flow rate is applied to each of the heat exchangers 420, 430. Using thermometers 428, 429, 438, 439, and flow meters 427, 437 for determining cold water flow rate, mounted at inlet and outlet of respective heat exchangers, the processing and controlling section 413 calculates the quantity of exchanged heat (=temperature difference×flow rate×specific heat).

Also the aqueous solution flows initially at almost equal rate through each of the heat exchangers 420, 430. During the progress of cooling, hydrate slurry is generated in the heat exchangers, and the hydrate adheres to the cooling surface of the plates, (for reference, the adhered quantity differs between the heat exchangers), which becomes the thermal resistance to decrease the quantity of exchanged heat. When the hydrate adheres to the cooling surface of plates, the adhered hydrate becomes the resistance to flow to vary the flow rate, and results in the increase of pressure difference of aqueous solution between the inlet and the outlet of aqueous solution on heat exchanger.

From this point of view, for example, when the quantity of exchanged heat at the heat exchanger 420 becomes below a preliminarily specified level, or when the flow rate and the pressure difference determined by the flow meter 451 and pressure difference gauge 453, respectively, exceed a preliminarily specified flow rate and pressure difference, the aqueous solution cutoff valves 421, 422 are closed, the cold water cutoff valves 423, 424 are closed, the hot water cutoff valves 425, 426 are opened, further the hot water pump 412 is actuated to let the hot water in the hot water tank 409 pass through the cold water passage in the heat exchanger 420, thus conducting the operation for melting hydrate to melt the hydrate adhered to the cooling surface of plates. The hot water referred herein may be at 12° C. or higher temperature. Accordingly, hot water can use outlet hot water and drain water of absorption refrigerating machine, cooling water of a cooling tower, on return water of an air-conditioner.

After a specified period of hydrate melting operation or after the observed temperature of outlet of cold water passage of the heat exchanger 420 turned to rise, the open/close of the above-described cutoff valves are switched again to conduct the cooling operation of aqueous solution to generate hydrate slurry. During the operation, total flow of the aqueous solution is not stopped.

For another heat exchanger 430, similar operation with that for the heat exchanger 420 is given.

That melting operation is given successively to attain stable production of hydrate slurry.

If fine particles (such as granulated slag particles) are adhered to the cooling surface of plates at aqueous solution side in advance, the degree of supercool (temperature becoming below the solidification point of hydrate) can be minimized to assure stable production of hydrate slurry.

Conventionally, plates of plate heat exchanger are made of stainless steel, copper, titanium, and the like. They are, however, in as-formed state of base material, without giving surface treatment, so the generated hydrate adheres to the plate surface, and once adhered hydrate is not easily separated. To this point, description on effective means to prevent adherence of hydrate slurry onto the plate surface of plate-type heat exchanger is given below.

The first means is to apply coating on the surface of cooling side of plate, or aqueous solution side, to reduce friction factor thereof. The coating includes electroplating such as hard chromium coating, nickel coating, iron coating, alloy coating, electroless nickel coating using phosphorus, boron, or the like, dispersion coating such as electrocrystallization coating and electroless nickel coating, and lubricating alloy coating.

The second means is to apply coating, painting, or polishing to the surface of plate-type at the side of the hydrate slurry flow to reduce friction factor and surface roughness. The coating includes that of fluororesin, silicone resin, and inorganic resin.

By processing the surface of the plate-type at the side of the hydrate slurry flow, as in the case of the first means and the second means, the hydrate slurry becomes difficult to adhere to the plate-type surface, thus allowing stable production of hydrate slurry.

In the production of hydrate slurry, hydrate is generated on the cooling surface of plate-type of the heat exchanger during the process of cooling the aqueous solution. When the cooling further proceeds, the percentage of hydrate in the hydrate slurry increases to increase the viscosity of the aqueous solution. As a result, the turbulence of the flow of aqueous solution in the heat exchanger is suppressed, which makes it difficult to separate hydrate from the cooling surface of the plate.

On the contrary, the output of the aqueous solution circulation pump 404 is increased at a certain interval to increase the flow speed of hydrate slurry in the aqueous solution flow passage in the plate-type heat exchangers 420, 430. Consequently, the enhanced flow promotes the separation of hydrate adhered to the cooling surface of plate, thus allowing stable production of hydrate slurry. The interval of intermittent operations may be arbitrarily determined.

Also when the pump for circulating the aqueous solution is controlled at a fixed flow rate by using an inverter or the like, the hydrate, which is adhered on the cooling surface of the plates of heat exchangers 420, 430, increases the pressure drop across the heat exchangers. In this case, the rotational speed of the pump is increased, depending on the automatically rising of the output or discharge pressure of the pump. Consequently, the fluid force increases to enhance the hydrate, which is attached to the cooling surface of the plates, to separate. In the end, the method makes it possible to produce the hydrate slurry at a constant level.

Best Mode F

In case of producing hydrate slurry, it is effective to disperse and float nucleus particles, which become hydrate particles in the aqueous solution, in order to prevent super-cooling. The fine particles as nuclei are particularly effective when they have a diameter size of 10 μm or less. Those fine particles are easily dispersed and floated in aqueous solution so that they become nuclei of hydrate particles and that they have very strong effect of preventing super-cooling. If the concentration of the fine particles having a diameter size of 10 μm or less is 0.1 mg/l or more, the nucleus particles sufficiently get in contact with the aqueous solution. And the contact is effective for preventing supercooling. Normal drinking water has Grade 1 of turbidity, and industrial water has around Grade 20 of turbidity, (1 mg-kaolin/l is defined as Grade 1 of turbidity). So, these drinking water and industrial water contain 0.1 mg/l or more of fine particles as a concentration. Therefore, the usage of drinking water or industrial water as the water for aqueous solution containing guest compound can prevent the super-cooling. If the fine particles having a diameter size of 10 μm or less are used as the nucleus particles, the upper limit of the concentration thereof in the aqueous solution is around 100 mg/l. If the fine particles, which exceed the upper limit, are dispersed and floated in the aqueous solution, the heat transfer performance of the heat exchanger degrades, which does not invite a preferable result.

In case that the fine particles as the nucleus fine particles have diameter size of 100 μm or less, agitating the aqueous solution brings the aqueous solution the effectiveness for preventing super-cooling, by enhancing to disperse and to float the fine particles in the aqueous solution. Jet flow in the aqueous solution or agitating by rotary blades is applied for the agitating means. Adequate range of the concentration of fine particles in the aqueous solution is from 1 mg/l to 5 g/l. If the concentration exceeds the upper limit, drift or stagnant zone likely appears in the apparatus for generating hydrate slurry, which is not preferable. If the concentration is less than the lower limit, the effectiveness for preventing super-cooling reduces to a lower degree.

In case that the fine particles as the nucleus fine particles have diameter size of 300 μm or less, super-cooling is prevented by adhering the nucleus particles to the surface of the inner wall of the hydrate slurry generating apparatus, or by adhering the nucleus particles to the surface of the blade of the agitator or the like, which contact with the aqueous solution in advance. The concentration of the adhered nucleus particles is 1 g/l or more, to the total concentration value of the aqueous solution. The adhered surface may cover the whole surface area that contacts with the aqueous solution.

Dispersing and floating fine particles, which have heavier specific gravity than the specific gravity of the aqueous solution, may also prevent the super-cooling. Since the nucleus particles precipitate in the aqueous solution, they fully contact with the aqueous solution to readily become the nuclei of hydrate particles. Stable production of hydrate slurry is assured by designing the apparatus and by setting the operational conditions to optimize the time of precipitation of fine particles in the aqueous solution and the time of generation of the hydrate slurry in the hydrate generation apparatus.

The above-described methods for preventing super-cooling to contact various kinds of nucleus particles with the aqueous solution, which generates the hydrate particles, give prospective effect, even when one of these methods is solely applied to. Applying two or more of these methods also attains prospective effect, simultaneously.

The method according to the Best Mode F and an Embodiment of apparatus for carrying out the Best Mode F are described below referring to the drawings. Cooling an aqueous solution containing tetra-n-butylammonium bromide (TBAB) as the guest compound produces the hydrate slurry. In this Embodiment, plurality of mechanisms having characteristics of the Best Mode F are applied, and plurality of Embodiments for carrying out the Best Mode F for convenience of understanding. Nevertheless, actual apparatus and method are not requested to apply all of these pluralities of mechanisms and of Embodiments.

Figure 28:
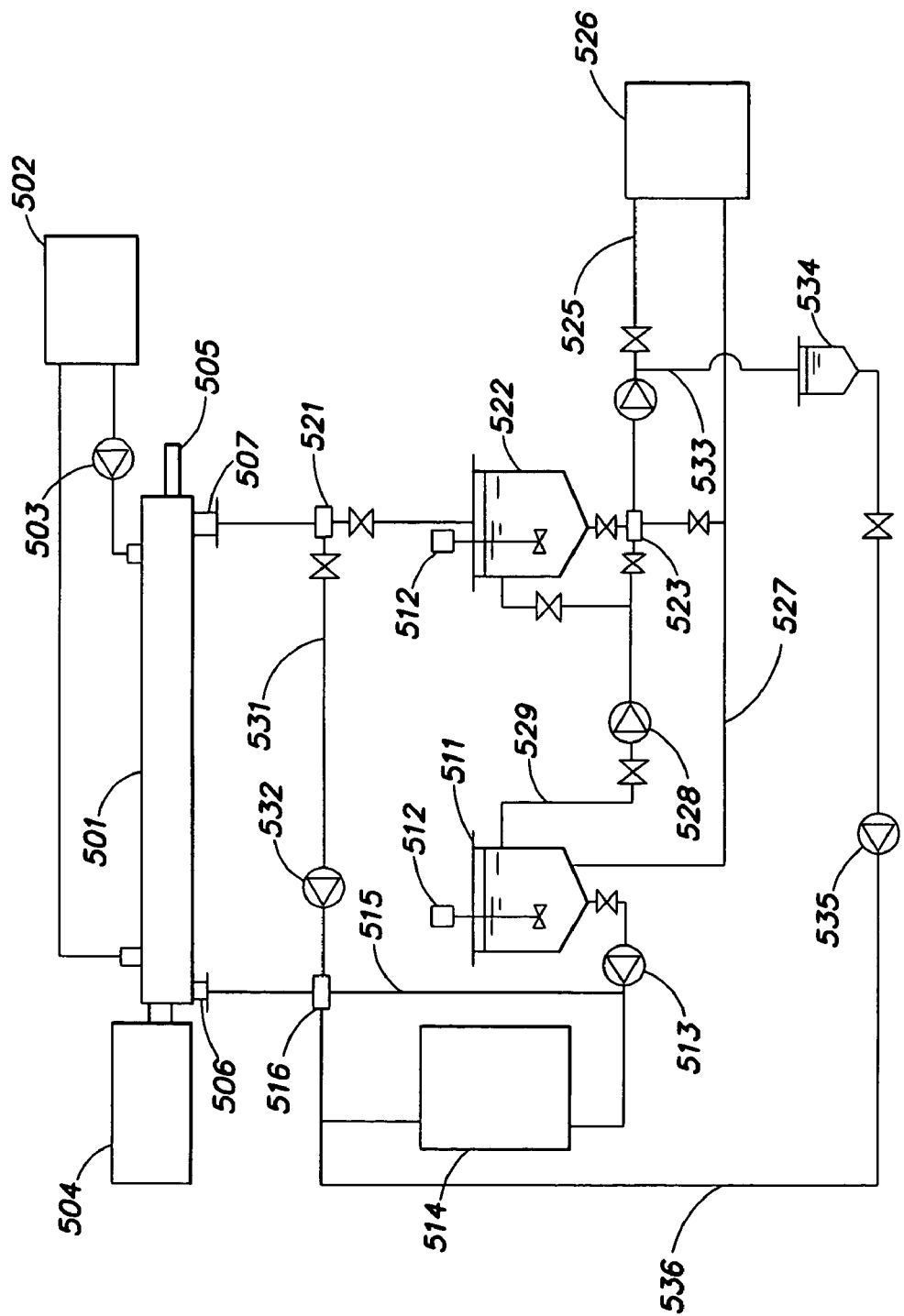
FIG. 28 shows a schematic drawing of the apparatus of a Embodiment of the Best Mode F according to the present invention.
Figure 29:
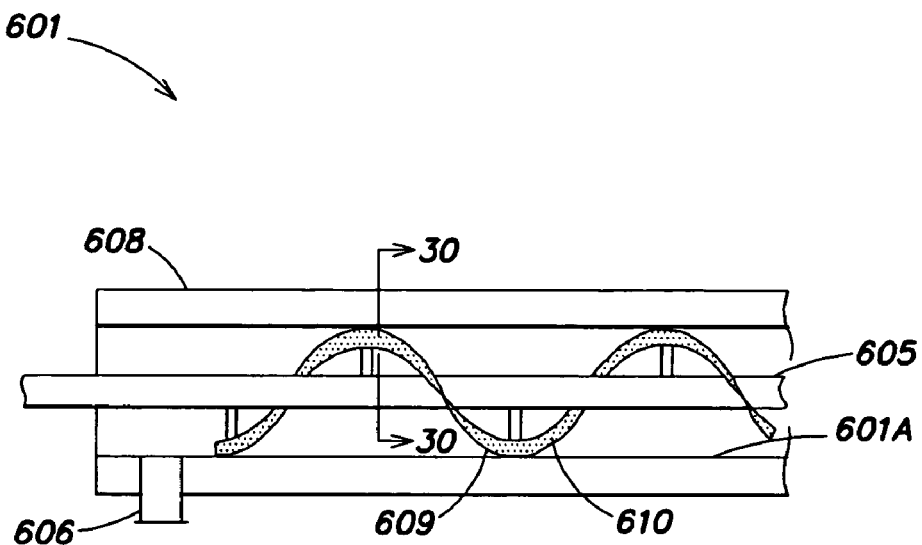
FIG. 29 shows a longitudinal part cross sectional view of the generation heat exchanger of a Embodiment of the Best Mode F according to the present invention.

FIG. 28 includes a generation heat exchanger 501 that cools the above-described aqueous solution to generate hydrate slurry. As shown in FIG. 29, a generation heat exchanger 601 (501 in FIG. 28) is in a cylindrical shape, having a heat transfer surface 610*a* at inner peripheral surface thereof. A cooling jacket 608 through which a coolant flows surrounds the heat transfer surface 610*a*. The coolant circulates between the heat cooling jacket 608 and a refrigerating machine 502 by a pump 503 to cool the internal aqueous solution across the heat transfer surface 601*a*, thus generating the hydrate.

A rotary shaft 605 (505 in FIG. 28) is positioned at center of the generation heat exchanger 601, and the rotary shaft 605 is driven by a drive mechanism 504 at a specified rotational speed. The rotary shaft 605 is equipped with a spiral separation blade member 609. The separation blade member 609 rotates with the rotary shaft 605 in a contact-sliding mode on the heat transfer surface 601*a*, thus separating the hydrate adhered to the heat transfer surface 601*a* to prevent degradation of heat exchange efficiency of the heat transfer surface 601*a*, and to disperse the separated hydrate into the aqueous solution for assuring more homogeneous hydrate slurry.

Furthermore, adding to the above-described effect, the separation blade member 609 keeps the aqueous solution in flowing state by agitating thereof in the generation heat exchanger 601. The means to keep the aqueous solution in flowing state is not limited to the one given above, and it may be arbitrary one if only the means keeps the aqueous solution in flowing state by preventing the generation of condition that a laminar flow layer of the aqueous solution contacting the heat transfer surface 601*a* is established to sustain an infinitesimal portion of the laminar flow layer of the aqueous solution contacting the heat transfer surface 601*a*.

Figure 30:
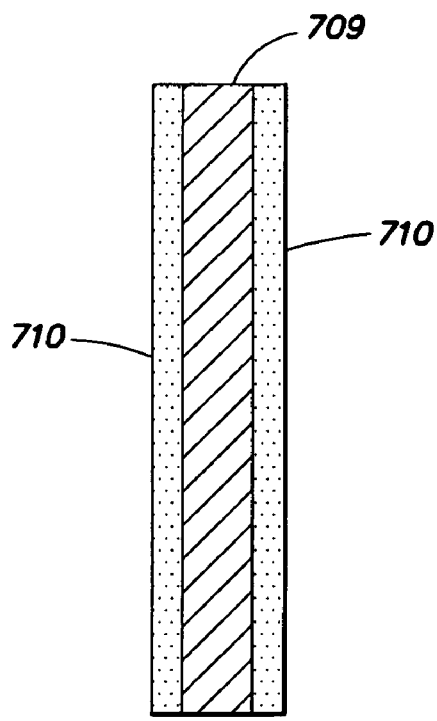
FIG. 30 shows a cross sectional view of a separation blade member viewed along line 30—30 of FIG. 29 of the Best Embodiment F according to the present invention.

As shown in FIG. 30, the surface of the separation blade member 609 is covered by a surface 710 on which the nucleus particles are adhered. The nucleus particles adhered surface 710 is prepared by applying a mixture of fine particles, for example, of granulated slag particles, prepared by ejecting water against a blast furnace slag to finely pulverize, mixed with a binder. The nucleus particles adhered surface 710 is not limited to position on the surface of the separation blade member 609, and may be located at any surface where the flowing aqueous solution contact therewith.

The description of the mechanism of circulation of the aqueous solution around the generation heat exchanger 501 (601 in FIG. 29) is given below. The reference number 511 in the figure designates an aqueous solution tank to hold the aqueous solution. The aqueous solution in the aqueous solution tank 511 is supplied to a charge opening 506 of the generation heat exchanger 501 by a pump 513 via a supply pipe 515 and a mixer 516.

The hydrate slurry generated by cooling the aqueous solution in the generation heat exchanger 501 is discharged from a discharge opening 507, and is sent to a hydrate slurry tank 522 via a distributor 521, where the hydrate slurry is stored. Each of the hydrate slurry tank 522 and the aqueous solution tank 511 has an agitator 512.

The hydrate slurry in the hydrate slurry tank 522 is discharged from the bottom thereof, and is sent to a hydrate concentration regulator 523. To the hydrate concentration regulator 523, the aqueous solution is supplied from the aqueous solution tank 511 by a pump 528 via a pipe 529, where the aqueous solution is mixed with the hydrate slurry at a specified mixing ratio to regulate the concentration of solid phase of the hydrate slurry. Then, the hydrate slurry is charged to a loading unit 526 such as air conditioner via a pipe 525. After utilized in the loading unit 526, the aqueous solution is returned to the aqueous solution tank 511 via a return pipe 527.

The nucleus particles charge mechanism that is positioned in the pipeline described above and that prevents supercooling is described below. The aqueous solution passing through the system contains a specified quantity of nucleus particles in advance. Applicable nucleus particles are various kinds of materials, and the above-described granulated slag particles are preferred because they are inexpensive, give stable characteristics, and give strong effect of preventing super cooling. The granulated slag particles have heavier specific gravity than that of aqueous solution, thus they have a sedimenting property.

A part of the hydrate slurry discharged from the discharge opening 507 of the generation heat exchanger 501 is supplied to the mixer 516 by a pump 532 via the distributor 521 and a pipe 531, and is fed to the charge opening 506 of the generation heat exchanger 501 along with the aqueous solution.

A part of the hydrate slurry discharged from the bottom of the hydrate slurry tank 522 is sent to a hydrate particles tank 534 for preventing supercooling via a pipe 533, where they are stored. The hydrate particle tank 534 is, for example, an insulation tank, and is able to store the accepted hydrate slurry for a specified period without inducing melting of the hydrate particles.

The hydrate slurry in the hydrate particles tank 534 is sent to the mixer 516 by a pump 535 via a pipe 536, and is fed to the charge opening 506 of the generation heat exchanger 501 along with the aqueous solution.

The apparatus is provided with a hydrate particle generation mechanism 514. The hydrate particles generation mechanism 514 can be operated separately from the hydrate production apparatus containing the generation heat exchanger 501, and is able to produce hydrate slurry containing small amount of hydrate particles.

The hydrate slurry produced by the hydrate particles generation mechanism 514 is sent to the mixer 516, and is fed to the charge opening 506 of the generation heat exchanger 501 along with the aqueous solution.

The function of the above-described apparatus, and the method for preventing supercooling according to the Best Mode F are described below. When the apparatus is operated, the aqueous solution in the generation heat exchanger 501 (601 in FIG. 29) contacts with the heat transfer surface 601*a*, in flowing state, and is cooled. Even when an infinitesimal portion of the aqueous solution contacts with the heat transfer surface 601*a* to become a super-cooled state, the infinitesimal portion immediately flows away and contact with nucleus particles adhered surface 610 on the separation blade member 609. By the contact with the nucleus particles, or granulated slag particles, on the nucleus particles adhered surface 610, the super-cooled state of the infinitesimal portion is vanished to generate the hydrate particles. As a result, whole of the aqueous solution in the generation heat exchanger 601 (501) does not enter the super-cooled state, and the supercooling is effectively prevented.

As described above, the aqueous solution contains nucleus particles such as granulated slag, and a part of them flows into the generation heat exchanger 501 (601) along with the aqueous solution. Accordingly, the nucleus particles contact with the infinitesimal portions of the aqueous solution in super-cooled state to vanish the supercool and to generate the hydrate particles.

Once the hydrate particles are generated using the nucleus particles, the nucleus particles are rejected from the generated hydrate particles. Consequently, the nucleus particles in the aqueous solution are sent to the hydrate slurry tank 522 along with the generated hydrate slurry, where they are separated and precipitated to the bottom of the tank. As a result, during the operation of the apparatus, the nucleus particles precipitate and store at the bottom section of the hydrate slurry tank 522, and the quantity of nucleus particles that are floating in the aqueous solution decreases.

To cope with the phenomenon, a part of the discharged hydrate slurry is fed to the generation heat exchanger 501 using the pump 532 via the pipe 531 and the mixer 516. Similar with the above-described nucleus particles, the hydrate particles in the aqueous solution overcome the super-cooled state and generate the hydrate particles. Since the generated hydrate particles is the same kind of hydrate with the targeted hydrate, they are the most effective nuclei for generating the hydrate, and they give extreme effect of preventing super-cooling.

When the apparatus resumes operation after stop-operation, the above-described hydrate slurry discharged from the generation heat exchanger 501 cannot be available. In that case, the hydrate slurry stored in the hydrate particles hold tank 534 is charged to the supply opening 506 of the generation heat exchanger 501 via the pipe 536.

Even when all of the hydrate particles in the hydrate particles hold tank 534 is melted, the effect of preventing super-cooling can be obtained by supplying the aqueous solution in the tank to the generation heat exchanger 501.

That is, since the nucleus particles are precipitated at the bottom of the hydrate particles hold tanks 522, as described above, the nucleus particles are recovered in the hydrate particles hold tank 534. Accordingly, by supplying these nucleus particles to the generation heat exchanger 501 along with the aqueous solution, the super-cool is prevented. Therefore, the hydrate particles hold tank 534 and related pipelines function both of recovering the nucleus particles and of re-charge mechanism.

On starting the operation of the apparatus, if the charge of hydrate slurry from the hydrate particles hold tank 534 is not available, the hydrate particles generation mechanism 514 may be operated separately to charge the generated hydrate slurry to the generation heat exchanger 501 to prevent supercooling.

As described above, continued operation of the apparatus may result in precipitation of the nucleus particles onto the bottom of the hydrate slurry tank 522 to eliminate almost all of the floating nucleus particles in the aqueous solution, in some cases. On resuming operation of the apparatus under the condition, very heavy supercooling may appear. Even in that situation, however, charging the hydrate particles from the hydrate particles generation mechanism to the generation heat exchanger 501 in advance effectively prevents the super-cooling.

To avoid unnecessary increase in the number of Embodiments for description, the Embodiments given above adopt plurality of mechanisms of the apparatus and methods for operating the apparatus according to the Best Mode F. Nevertheless, all of the described mechanisms and methods are not necessarily applied at a time, and an actual apparatus may adopt any one of them or more one of them.

The results of experiments carried out to confirm the effects of individual mechanisms and methods described above are described below referring to FIGS. 31 through 34. The experiments were conducted under the condition that a TBAB aqueous solution was cooled under agitation. The effect in each of above-described methods was confirmed. That is, the case that granulated slag particles, as the nucleus particles, having 100 μm or smaller size were mixed in an aqueous solution to concentrations of 1 mg/l or more; the case that a member adhered with granulated slag particles having 300 μm or smaller size was immersed; and the case that hydrate particles were mixed in an aqueous solution.

As a reference example, an aqueous solution of TBAB 25-wt. % was cooled without agitation, and was analyzed by a differential thermal analyzer to determine the super-cooled state under cooling the aqueous solution without agitation. The result was that the aqueous solution was cooled to −16° C. before vanishing the supercooling state.

Figure 31:
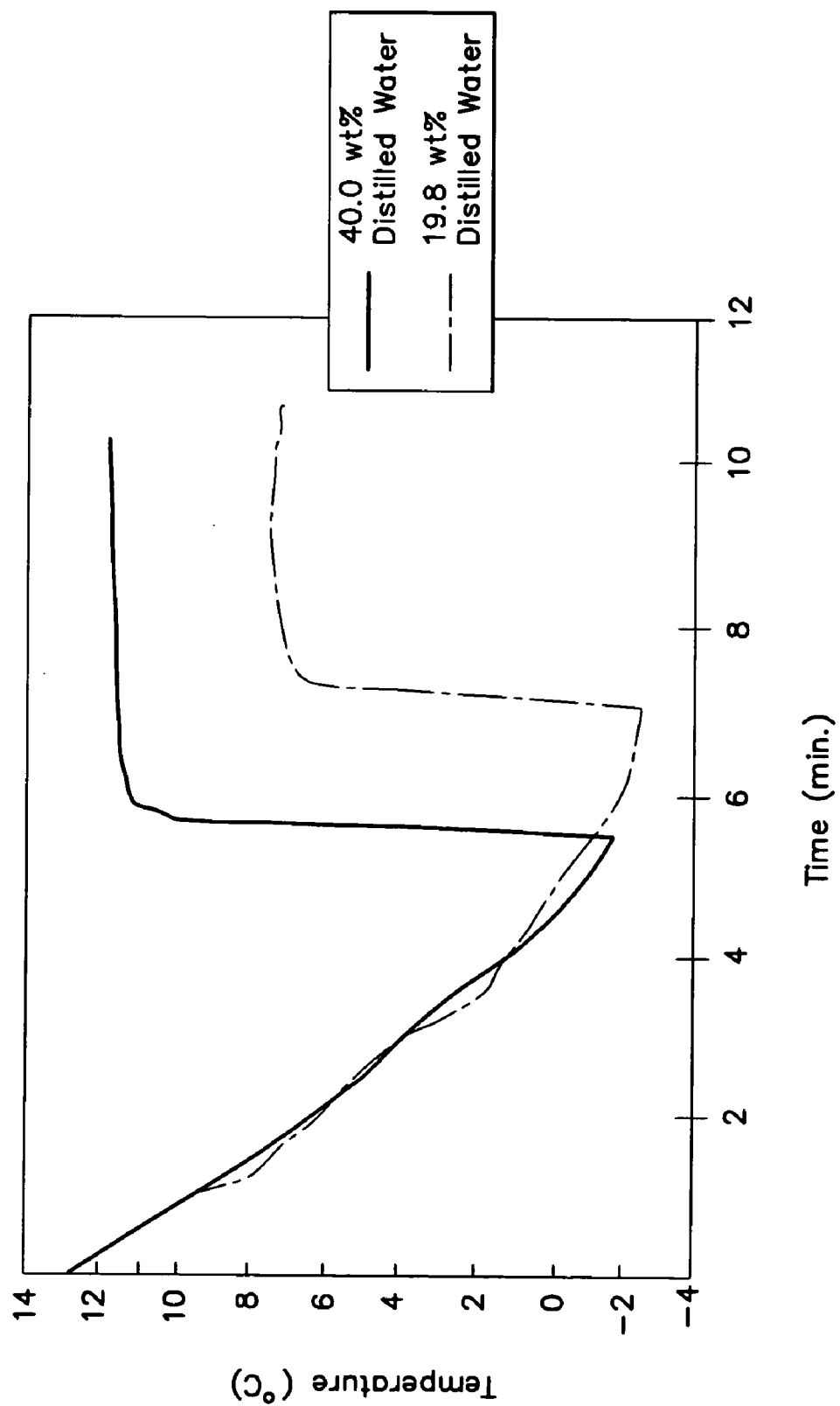
FIG. 31 is a diagram of the result of an experiment conducted to confirm the effect of the Best Mode F according to the present invention.

FIG. 31 shows the case that no nucleus particles were mixed in the aqueous solution. As seen in the figure, supercool of about −2° C. appeared for both cases of 40% and 19.8% of concentration of aqueous solution.

Figure 32:
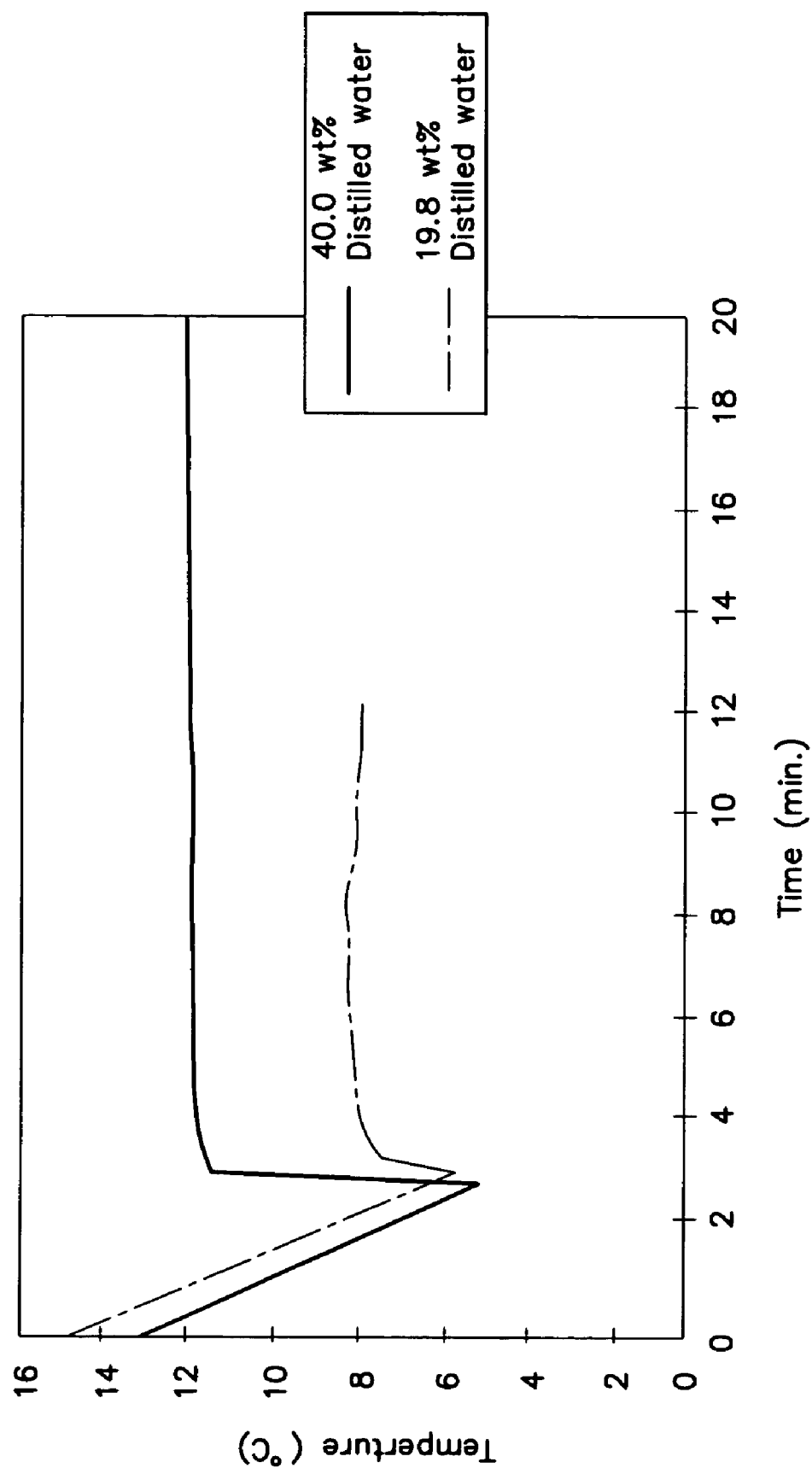
FIG. 32 is another diagram of the result of an experiment conducted to confirm the effect of the Best Embodiment F according to the present invention.

FIG. 32 shows the case that granular particles having 100 μm or smaller size are mixed as the nucleus particles in the aqueous solution. The figure shows high preventive effect against supercooling, down to about 4° C. for 40% concentration of aqueous solution, and to about 6° C. for 19.8% concentration of aqueous solution.

Figure 33:
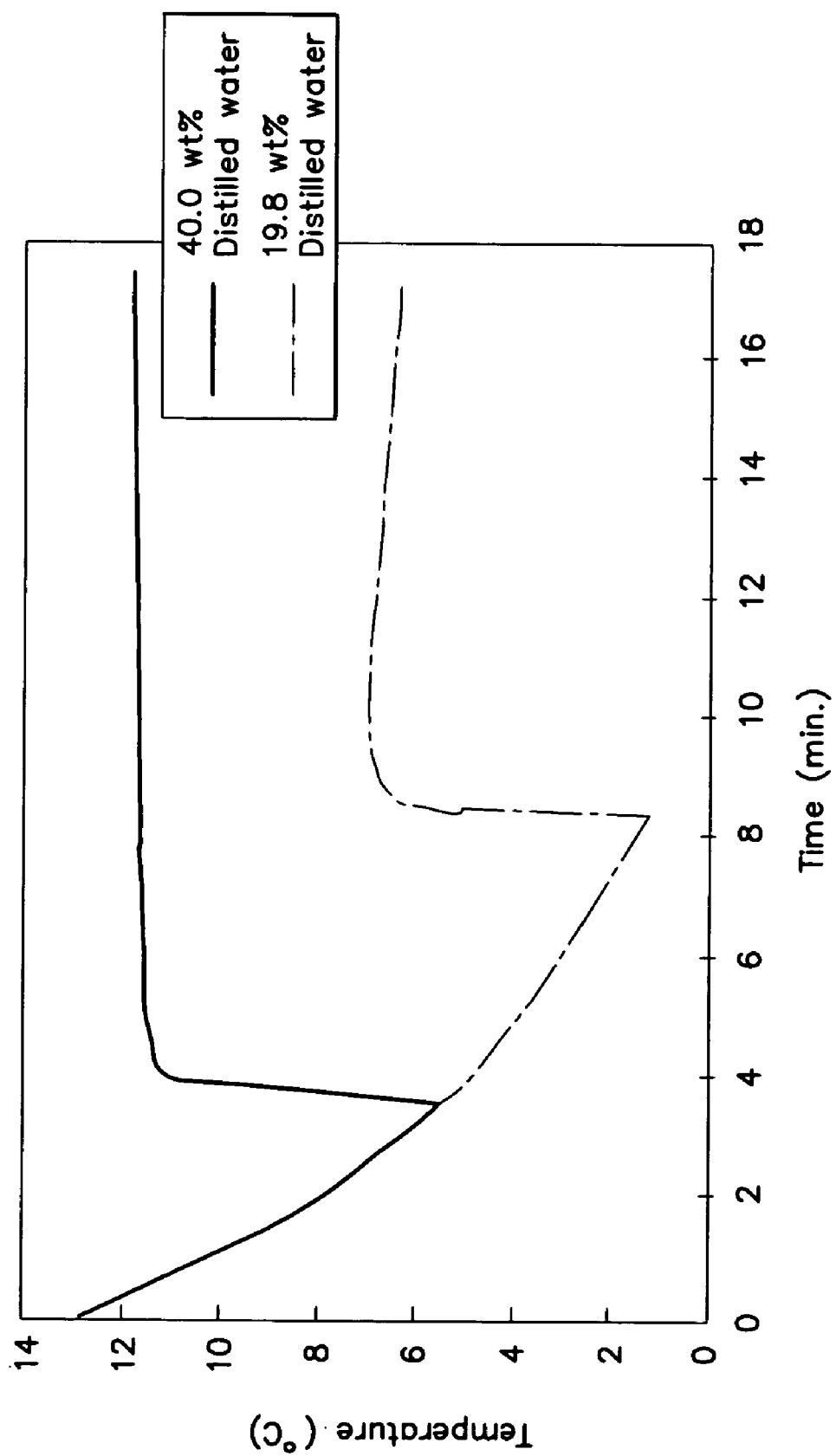
FIG. 33 is further diagram of the result of an experiment conducted to confirm the effect of the Best Mode F according to the present invention.

FIG. 33 is the case that a glass rod on which granular slag particles having 300 μm or smaller size are adhered as the nucleus particles is immersed in the aqueous solution. For 19.8% concentration of aqueous solution, supercool appeared down to about 1° C., and for 40% concentration, supercool appeared to about 6° C. which suggests high preventive effect against supercooling.

Figure 34:
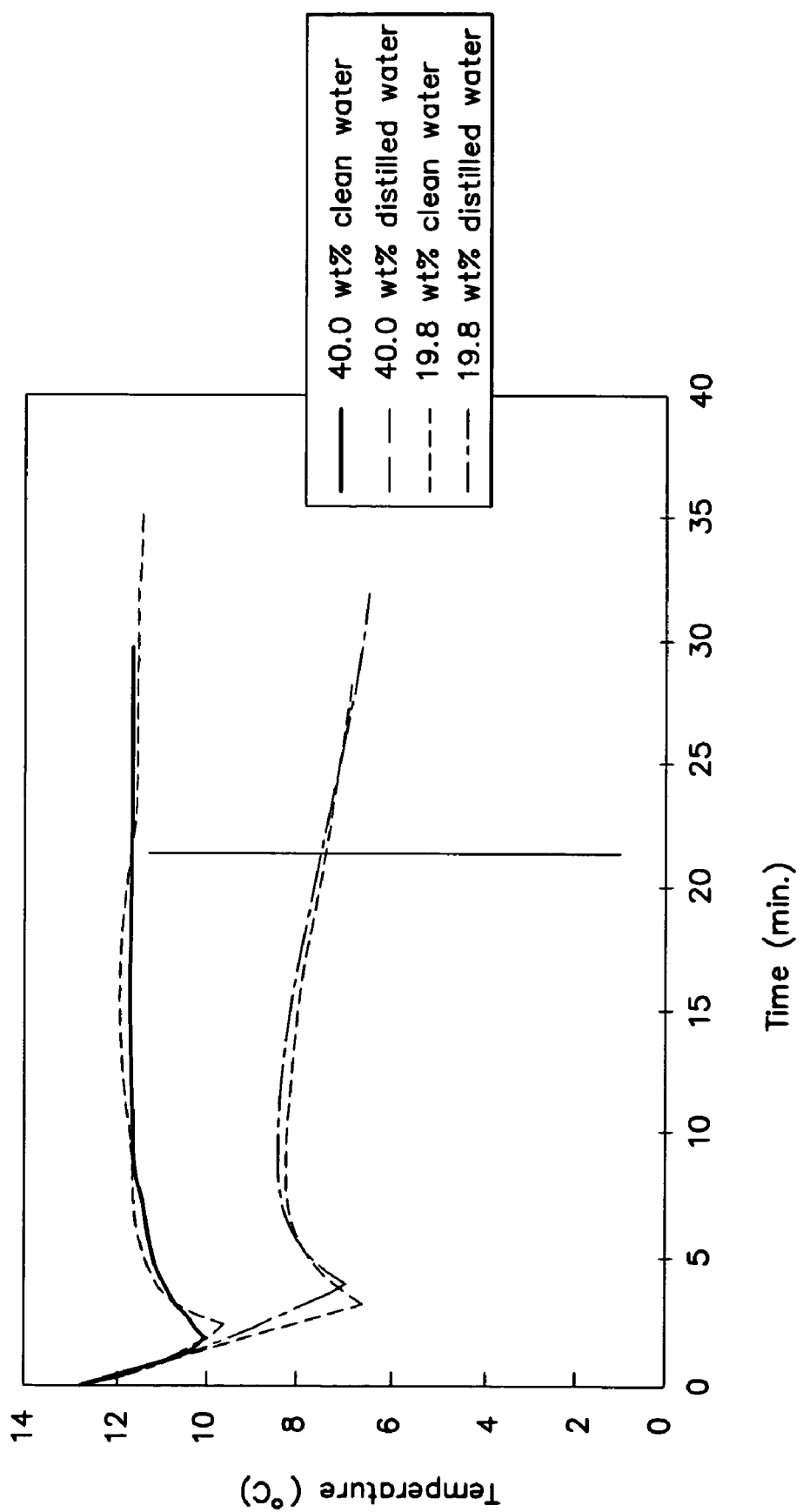
FIG. 34 is still another diagram of the result of an experiment conducted to confirm the effect of the Best Embodiment F according to the present invention.

FIG. 34 is the case that hydrate particles are mixed in the aqueous solution. For reference, the results of using distilled water and of using drinking water for preparing the aqueous solution are also given in the figure. As shown in the figure, extremely high preventive effect to supercooling is attained, giving supercool to about 7° C. for 19.8% concentration and 10° C. for 40% concentration.

The Best Mode F is not limited to the above-given Embodiments. For example, the above-given Embodiments deal with the case of using a generation heat exchanger of cooling cylinder type provided with separation blade member. The Best Mode F is not limited to the case, and, for example, a shell and tube generation heat exchanger may be applied.

The nucleus particles used in the Best Mode F are not limited to those having heavy specific gravity. For example, nucleus particles having almost equal specific gravity with that of the aqueous solution may be used. Those nucleus particles flow with the aqueous solution and do not sediment, so they prevent various kinds of problems caused by precipitation of the nucleus particles.

INDUSTRIAL APPLICABILITY

As described above, the apparatus according to the Best Mode provides large thermal storage capacity owing to the latent heat of hydrate sealed in the container of the cooling medium body. Since the container contains fine particles, the fine particles act as the nuclei of the hydrate particles to enhance the generation of the hydrate particles, thus preventing supercool of the aqueous solution. Since the aqueous solution in the container of the cooling medium body is agitated by changing the position of the container or by other actions, the fine particles stay in dispersed and floated state in the aqueous solution, without sedimenting, thus avoiding degradation of the effect to prevent supercooling. As described above, the effect of the apparatus is strong.

Furthermore, according to the Best Mode, a TBAB hydrate slurry-base thermal storage medium that reduces corrosiveness is presented.

In addition, according to the Best Mode, a method for producing a hydrate-base thermal storage medium that can be generated at higher temperature than the temperature of ice is provided without using special coolant. In particular, by cooling the TBAB aqueous solution at a specified cooling rate, the TBAB secondary hydrate that has excellent heat capacity is efficiently produced while suppressing the appearance of supercool of the primary hydrate.

What is claimed is:

1. A thermal storage apparatus for using a hydrate thermal storage medium comprising:
   (a) a storage tank for storing a cooling medium liquid;
   (b) a refrigerating machine, connected with the storage tank via a pipe for cooling the cooling medium liquid, the cooling medium liquid circulating between the storage tank and the refrigerating machine; and
   (c) a thermal storage body immersed in the cooling medium liquid, wherein the thermal storage medium comprises a hermetically sealed container containing an aqueous solution which generates at least one hydrate selected from the group consisting of a primary hydrate and a secondary hydrate, wherein the primary hydrate has a smaller hydration number and a smaller heat capacity than the secondary hydrate, and wherein the secondary hydrate has a larger hydration number and a larger heat capacity than the primary hydrate.

2. The thermal storage apparatus according to claim 1, wherein the aqueous solution contained in the hermetically sealed container contains a guest compound, and wherein a generation temperature of at least one hydrate selected from the group consisting of the primary hydrate and the secondary hydrate varies in accordance with the concentration of the aqueous solution.

3. A hydrate cold thermal storage transporting medium comprising:
 an aqueous solution containing a guest compound to generate hydrate particles to create a hydrate slurry by cooling; and
 a corrosion inhibitor having a concentration of 5,000 wt. ppm or less.

4. The hydrate thermal storage medium according to claim 3, wherein the corrosion inhibitor is at least one compound selected from the group consisting of sodium nitrite, sodium sulfite, sodium pyrophosphate and benzotriazole.

5. A hydrate thermal storage medium comprising an aqueous solution containing a guest compound which generates by cooling the aqueous solution at least one hydrate selected from the group consisting of a primary hydrate and a secondary hydrate, wherein the primary hydrate has a smaller hydration number and a smaller heat capacity than the secondary hydrate, and wherein the secondary hydrate has a larger hydration number and a larger heat capacity than the primary hydrate.

6. The hydrate thermal storage medium according to claim 5, wherein the guest compound is one compound selected from the group consisting of a tetra-n-butylammonium salt, a tetra-isoamylammonium salt, a tetra-iso-butylphosphonium salt and a tri-iso-amylsulfonium salt.

7. A method for producing a hydrate thermal storage medium comprising the steps of:
 (a) preparing an aqueous solution containing a guest compound; and
 (b) cooling the aqueous solution to generate at least one hydrate selected from the group consisting of a primary hydrate and a secondary hydrate, wherein the primary hydrate has a smaller hydration number and a smaller heat capacity than the secondary hydrate, and wherein the secondary hydrate has a larger hydration number and a larger heat capacity than the primary hydrate.

8. The method according to claim 7, wherein the aqueous solution is cooled at a rate of 6 kcal/hr-kg or more.

9. The method according to claim 7, wherein the guest compound is contained in the aqueous solution in a concentration of from 10 to 26 wt. %.

10. The method according to claim 7, wherein the aqueous solution is cooled to a temperature range of from 50° C. to 8° C.

11. The method according to claim 7, wherein the guest compound is one compound selected from the group consisting of a tetra-n-butylammonium salt, a tetra-iso-amylammonium salt, a tetra-iso-butylphosphonium salt and a tri-iso-amylsulfonium salt.

12. The method according to claim 7, the aqueous solution is cooled to a generation temperature or less of the secondary hydrate.

13. A hydrate thermal storage medium comprising:
 an aqueous solution contained in a hermetically sealed container to generate at least one hydrate selected from the group consisting of a primary hydrate and a secondary hydrate, wherein the primary hydrate has a smaller hydration number and a smaller heat capacity than the secondary hydrate, and wherein the secondary hydrate has a larger hydration number and a larger heat capacity than the primary hydrate.

14. The thermal storage medium according to claim 13, wherein a guest compound is contained in the aqueous solution in a concentration of 10% to 26%.

15. The thermal storage medium according to claim 13, wherein a guest compound is contained in the aqueous solution, the guest compound being one compound selected from the group consisting of a tetra-n-butylammonium salt, a tetra-iso-amylammonium salt, a tetra-isobutylphosphonium salt and a tri-iso-amylsulfonium salt.

16. A hydrate cold thermal storage transporting medium comprising:
 a primary hydrate and a secondary hydrate, wherein the heat capacity than the secondary hydrate, and wherein the secondary hydrate has a larger hydration number and a larger heat capacity than the primary hydrate.

17. The hydrate cold thermal storage transporting medium according to claim 16, wherein a guest compound is contained in the aqueous solution in a concentration of 10% to 26%.

18. The hydrate cold thermal storage transporting medium according to claim 16, wherein a guest compound is contained in the aqueous solution, the guest compound being one compound selected from the group consisting of a tetra-n-butylammonium salt, a tetra-iso-amylammonium salt, a tetra-isoutylphosphonium salt and a tri-iso-amylsulfonium salt.

* * * * *